(12) United States Patent
Singh et al.

(10) Patent No.: US 11,721,799 B2
(45) Date of Patent: Aug. 8, 2023

(54) FREE-STANDING, BINDER-FREE METAL MONOXIDE/SUBOXIDE NANOFIBER AS CATHODES OR ANODES FOR BATTERIES

(71) Applicant: DREXEL UNIVERSITY, Philadelphia, PA (US)

(72) Inventors: Arvinder Singh, Philadelphia, PA (US); Vibha Kalra, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 17/112,445

(22) Filed: Dec. 4, 2020

(65) Prior Publication Data

US 2021/0111390 A1   Apr. 15, 2021

Related U.S. Application Data

(62) Division of application No. 16/372,067, filed on Apr. 1, 2019, now Pat. No. 10,886,525.

(Continued)

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0471* (2013.01); *H01M 4/1391* (2013.01);
(Continued)

(58) Field of Classification Search
CPC .. H01M 4/131; H01M 4/0471; H01M 4/1391; H01M 4/505; H01M 10/0525;
(Continued)

(56) References Cited

U.S. PATENT DOCUMENTS 10,886,525 B2   1/2021 Singh et al.
2007/0269655 A1*  11/2007 Joo .................. C30B 5/00
                                          423/608

(Continued)

OTHER PUBLICATIONS

Hobiger, G., et al. "The influence of titanium and oxygen vacancies on the chemical bonding in titanium oxide." Journal of Physics: Condensed Matter 2.20 (1990): 4595.

(Continued)

*Primary Examiner* — Andrew J. Oyer
(74) *Attorney, Agent, or Firm* — Mendelsohn Dunleavy P.C.

(57) ABSTRACT

A nanofiber mat comprises metal oxide nanoparticles distributed on surface of metal oxide nanofibers, wherein the nanofiber mat has a surface area at least 150 m²/g, and the metal oxide is selected from titanium monoxide $TiO_x$, wherein $0.65<x<1.25$, niobium monoxide $NbO_x$, wherein $0.982<x<1.008$, vanadium (II) oxide $VO_x$, wherein $0.79<x<1.29$, iron (II) oxide $Fe_xO$, wherein $0.833<x<0.957$, manganese (II) oxide $Mn_xO$, wherein $0.848<x<1.000$, titanium suboxide, $TiO_nO_{2n-1}$, wherein $n>1$, molybdenum suboxide, $Mo_nO_{3n-1}$, wherein $n>1$, $Mo_nO_{3n-2}$, wherein $n>1$, and vanadium suboxide, $V_nO_{2n-1}$, wherein $n>1$. Cathodes, anodes and batteries are made using the nanofiber mat. Processes for producing the metal oxide nanofiber mat and an electrode including it are also provided.

13 Claims, 19 Drawing Sheets
(18 of 19 Drawing Sheet(s) Filed in Color)

Related U.S. Application Data

(60) Provisional application No. 62/651,525, filed on Apr. 2, 2018.

(51) Int. Cl.
- H01M 4/505 (2010.01)
- H01M 10/0525 (2010.01)
- H01M 4/1391 (2010.01)
- H01M 4/02 (2006.01)

(52) U.S. Cl.
CPC ....... *H01M 4/505* (2013.01); *H01M 10/0525* (2013.01); *H01M 2004/021* (2013.01)

(58) Field of Classification Search
CPC .. H01M 2004/021; H01M 4/13; H01M 4/139; H01M 4/38; H01M 4/483; H01M 4/625; H01M 10/052; H01M 10/054; H01M 2004/027; H01M 2004/028; Y02E 60/10
See application file for complete search history.

(56) References Cited

U.S. PATENT DOCUMENTS

| | | | |
|---|---|---|---|
| 2010/0233812 A1* | 9/2010 | Sun | C01G 23/047 95/45 |
| 2017/0301924 A1* | 10/2017 | Kang | H01M 12/08 |

OTHER PUBLICATIONS

Jung, Ji-Won, et al. "Electrospun nanofibers as a platform for advanced secondary batteries: a comprehensive review." Journal of Materials Chemistry A 4.3 (2016): 703-750.

Kostenko, M. G., et al. "Vacancies in ordered and disordered titanium monoxide: Mechanism of B1 structure stabilization." Journal of Solid State Chemistry 204 (2013): 146-152.

Mlei, Shilin, et al. "Porous Ti4O7 Particles with Interconnected-Pore Structure as a High-Efficiency Polysulfide Mediator for Lithium-Sulfur Batteries." Advanced Functional Materials 27.26 (2017): 1701176.

Pang, Quan, et al. "Surface-enhanced redox chemistry of polysulphides on a metallic and polar host for lithium-sulphur batteries." Nature communications 5 (2014): 4759.

Rozes et al., "Titanium oxo-clusters: precursors for a Lego-like construction of nanostructured hybrid materials." Chemical Society Reviews 40.2 (2011): 1006-1030.

Singh, Arvinder et al., "TiO Phase Stabilized into Freestanding Nanofibers as Strong Polysulfide Immobilizer in Li—S Batteries: Evidence for Lewis Acid Base Interactions." ACS Applied Materials & Interfaces 10.44 (2018): 37937-37947.

Singhal, Richa et al., "Using common salt to impart pseudocapacitive functionalities to carbon nanofibers." Journal of Materials Chemistry A 3.1 (2015): 377-385.

Wei, Hao, et al. "Chemical Bonding and Physical Trapping of Sulfur in Mesoporous Magnéli Ti4O7 Microspheres for High-Performance Li—S Battery." Advanced Energy Materials 7.4 (2017): 1601616.

Xu, Baoqiang, et al. "Structures, preparation and applications of titanium suboxides." RSC Advances 6.83 (2016): 79706-79722.

Zhang, Yingji, et al. "Shape-controlled synthesis of Ti4O7 nanostructures under solvothermal-assisted heat treatment and its application in lithium-sulfur batteries" Journal of Alloys and Compounds 729 (2017): 1136-1144.

Zhang, Jian, et al. "High performance of electrochemical lithium storage batteries: ZnO-based nanomaterials for lithium ion and lithium sulfur batteries." Nanoscale 8.44 (2016): 18578-18595.

Li, Zhen, et al. "A sulfur host based on titanium monoxide@carbon hollow spheres for advanced lithium-sulfur batteries." Nature communications 7 (2016): 13065.

Seh, Zhi Wei et al., "Sulphur-TiO2 yolk-shell nanoarchitecture with internal void space for long-cycle lithium-sulphur batteries" Nature communications 4 (2013): 1331.

Huang, Jian-Qiu et al., "Three-Dimensional Porous Graphene Aerogel Cathode with High Sulfur Loading and Embedded TiO2 Nanoparticles for Advanced Lithium-Sulfur Batteries" ACS Applies Materials & Interfaces 8.42 (2016): 28663-28670.

Wei, Hao et al., "Chemical Bonding and Physical Trapping of Sulfur in Mesoporous Magnéli Ti4O7 Microspheres for High-Performance Li—S Battery" Advanced Energy Materials 7.42 (2017).

Singh, Arvinder et al., "Titanium Monoxide/Carbon Nanofibers as Sulfur Host for Li—S Battery", Presentation at 231st ECS Meeting, Jun. 1, 2017.

Singh, Arvinder et al., "Free-Standing, Binder-Free Titanium Suboxide Nanofiber Based Sulfur Cathodes for Li—S Batteries." Meeting Abstracts No. 5—The Electrochemical Society, (Apr. 15, 2017): 505-505.

* cited by examiner

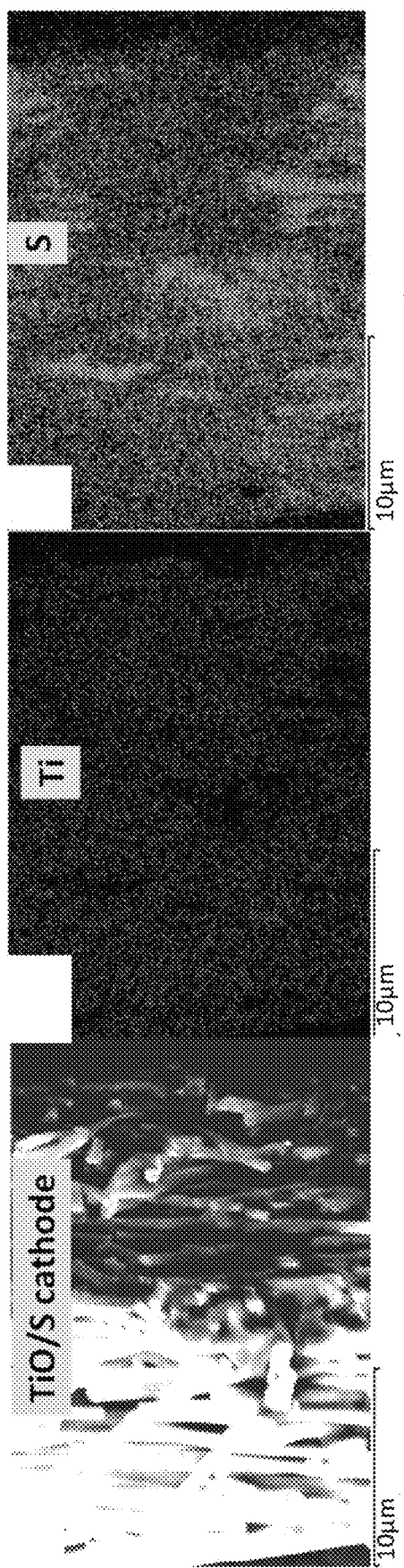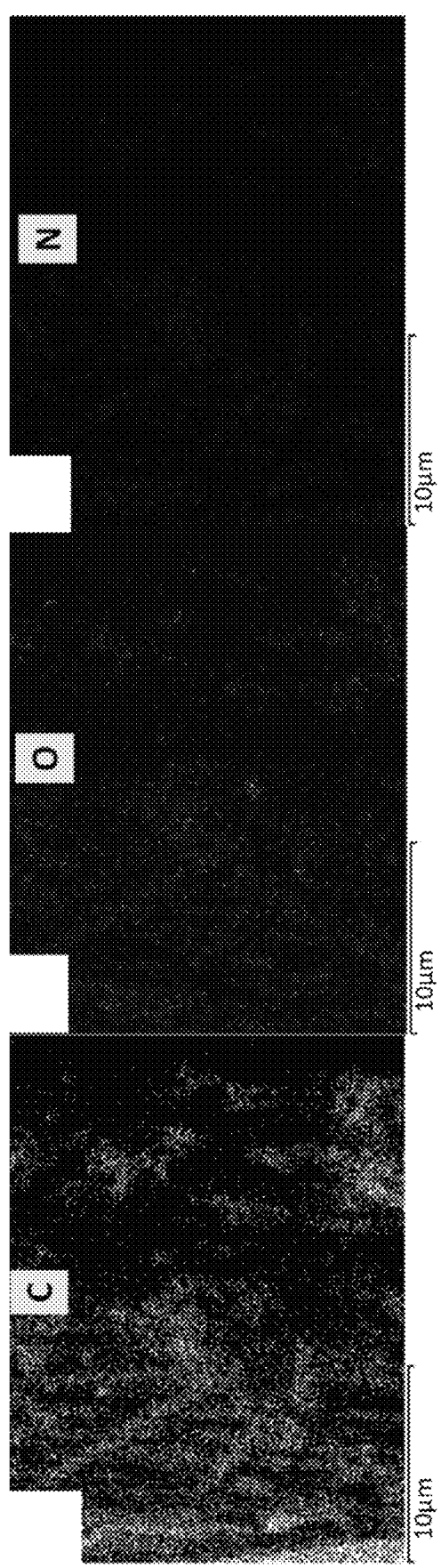
Fig. 4A  Fig. 4B  Fig. 4C  Fig. 4D  Fig. 4E  Fig. 4F

FREE-STANDING, BINDER-FREE METAL MONOXIDE/SUBOXIDE NANOFIBER AS CATHODES OR ANODES FOR BATTERIES

CROSS REFERENCE TO RELATED APPLICATIONS

This application claims the benefit of U.S. patent application Ser. No. 16/372,067, filed on Apr. 1, 2019, which, in turn, claims the benefit of U.S. Provisional Application No. 62/651,525, filed on, Apr. 2, 2018, the entire disclosures of which are hereby incorporated by reference as if set forth fully herein.

STATEMENT OF GOVERNMENT INTEREST

This invention was made with government support under Grant Nos. NSF CBET-1236466 and NSF 1537827 awarded by the U.S. National Science Foundation. The government has certain rights in the invention.

FIELD OF THE INVENTION

The present invention relates to electrodes for lithium batteries. In particular, the invention relates to a porous substrate for cathodes for lithium batteries and its production by electrospinning followed by rapidly diffusing sulfur into the porous substrate.

BACKGROUND OF THE INVENTION

Since the commercialization of lithium-ion batteries in the early 1990's, electrochemical energy storage demands for portable electronics, electric vehicles, and large-scale storage continue to exceed the capabilities of these batteries. Lithium sulfur (Li—S) has attracted attention owing to its high theoretical capacity of 1675 mAh g$^{-1}$ and its high energy density (2500 Wh kg$^{-1}$).[1-3]

Specifically, elemental sulfur (S) is one of the most attractive materials amongst all conversion based cathodes because of its high theoretical capacity (~1675 mAh/g), natural abundance, non-toxicity, and cost-effectiveness. Regarding gravimetric energy density, combining sulfur with lithium metal (capacity ~3861 mAh/g; density ~0.53 g/cm$^3$) is more promising than combining with Na (capacity ~1166 mAh/g; density ~0.968 g/cm$^3$) metal anode. By and large, the gravimetric energy density of packed Li—S cells is expected to reach 3-5 times higher energy density (500-600 Wh/kg) than those of commercially available Li-ion batteries (100-220 Wh/kg). This feature can significantly reduce the cost and weight of batteries thus making them ideally suitable for hybrid/electric vehicles and large-scale stationary storage systems. However, electrochemical conversion of sulfur to Li$_2$S brings various challenges, which are plaguing the commercial development of Li—S batteries.

The commercialization of Li—S batteries has been hindered by three key challenges: (i) the electronically insulating nature of sulfur (5×10$^{-30}$ S cm$^{-1}$ at 25° C.), (ii) large volume changes during lithiation-delithiation cycles (about 80%), and (iii) dissolution of soluble reaction intermediates (Li$_2$S$_n$, 4<n≤8) into electrolytes which migrate to the anode upon cycling (the so-called shuttling effect).[4-7] All of these factors (i)-(iii) contribute to poor performance by causing low sulfur utilization, fast capacity fade, poor cycling stability and low coulombic efficiency. Thus, significant research efforts focus on the production of a sulfur cathode with conductive components to improve sulfur utilization, nanostructures to accommodate volume expansion within the cathode, and sulfur-confinement to hinder polysulfide shuttling.

Various products incorporate these elements in highly sophisticated composites having specific nano-architectures. For example, Liang et al.[8] produced composites by reacting manganese dioxide nanosheets with sulfides yielding high capacity and long cycle life. Cui et al. produced sulfur-TiO$_2$ yolk-shell nanostructured cathodes with long cycle life. Many groups have developed micro/mesoporous carbon/ sulfur composites that show excellent confinement of sulfur and soluble polysulfides.[9-13] However, these sophisticated sulfur-nanomaterial composites require harsh slurry processing to fabricate a final electrode. In such processes, rigorous mixing of sulfur/nanomaterials, inactive conductive carbon powders (about 10-30 wt. %), and insulating binding agents (about 10 wt. %) in a highly toxic solvent (NMP) provides a thick slurry which is cast onto a heavy current collector (typically aluminum foil, about 5 mg cm$^{-2}$).[14, 15] The additives and current collector account for 30-50%[16] of the electrode weight, such that a final cathode (with the current collector) contains only about 25 wt. % sulfur despite having started with a sulfur nanocomposite with 80 wt. % sulfur. Furthermore, it is unclear to what extent the original architectures are retained after slurry processing.

Another aspect of improving the cathodes is improving the nano-architecture of the substrates on which the sulfur is deposited. Strenuous research efforts have been committed to developing various host materials including carbonaceous materials (micro-/mesoporous carbon, carbide-derived carbon, carbon nanofibers, carbon nanotubes, graphene), and conducting polymers (polyaniline, polypyrrole). These materials offer advantages of high electrical conductivity and low density but rely on weak physical attraction/trapping of lithium polysulfides (interaction energies between 0.5-1.3 eV). The poor affinity of such materials towards lithium polysulfides thus limits the use of higher sulfur loading and cyclic stability in Li—S batteries.

Polar metal oxides (with M$^{n+}$-metal ion centers) such as Al$_2$O$_3$, Co$_3$O$_4$, TiO$_2$, SiO$_2$, ZnO, and V$_2$O$_5$, on the other hand, have been proven to be effective inhibitors in polysulfide shuttling processes through polar-polar (energies between 2.6-3.5 eV) interactions. Among these, TiO$_2$ is of considerable interest due to its low cost, nontoxicity and ease of production in a variety of morphologies on a large scale. There are quite a few reports on the use of architecturally designed highly advanced structures of TiO$_2$ composites as polysulfide reservoirs in Li—S batteries. However, trapping of Li$_2$S$_n$ (8≤n≤4) through insulating TiO$_2$ (conductivity ~5×10$^{-30}$ S/cm for vacancies free lattice) would undermine coulombic efficiency in each consecutive cycle especially at higher sulfur loading. This effect is due to the deposition of insulating Li$_2$S$_2$/Li$_2$S in electronically inactive areas of TiO$_2$ during final reduction step (Li$_2$S$_4$→Li$_2$S$_2$/Li$_2$S). Therefore, cycling stability of TiO$_2$/ sulfur cathodes based Li—S is limited particularly at high sulfur loading. For example, Seh, Z. W. et al. designed an advanced sulphur-TiO$_2$ yolk-shell nanoarchitecture with internal void space and used as a cathode in Li—S batteries. A high specific capacity of ~1030 mAh g$^{-1}$ at 0.5 C rate and long-term cyclic stability over 1000 cycles was reported with a capacity decay as small as 0.033% per cycle. However, the reported excellent electrochemical performance is a consequence of a low sulfur loading (0.4-0.6 mg/cm$^2$) utilized in this study. Similarly, Jian, Q. H. et al. developed a three-dimensional architecture using $TiO_2$ nanoparticles embedded in porous graphene aerogel with a relatively higher sulfur loading of 1.1-1.3 mg/cm$^2$ and used it as a cathode for Li—S batteries. However, for these cathodes, the obtained initial discharge capacity of ~1158 mA h g$^{-1}$ at 0.5 C rate was sharply decreased to ~597 mAh g$^{-1}$ after 100 cycles. It is clear from the above discussion that introducing $TiO_2$ with lower conductivity is not suitable in Li—S batteries at higher sulfur loading since sulfur itself is a highly insulating material. Consequently, bi-functional titanium suboxide materials (e.g., $Ti_4O_7$ with 2 $Ti^{4+}$(3d$^0$) and 2 $Ti^{3+}$(3d$^1$)) and titanium monoxide (TiO with $Ti^{2+}$ (3d$^2$)) have been introduced to Li—S batteries.

These materials exhibit excellent electrical conductivity and, at the same time, a significant amount of oxygen vacancies. The presence of oxygen vacencies in these materials results in unsaturated Ti-centers in the crystal lattice and is thus expected to provide more anchoring sites with strong affinity towards lithium polysulfides. Nevertheless, synthesis of these sub-oxide materials requires a high-temperature carbothermal reaction, which gives a highly dense material in the irregular particulate form. There are only a few papers that report the use of such polar materials in Li—S batteries. Moreover, the sulfur loading in most reports is very low. For example, Hao, W. et al. recently reported the development of mesoporous Magneli $Ti_4O_7$ microspheres (surface area ~197.2 m$^2$/g) based sulfur cathodes with a sulfur loading of only 0.4-0.6 mg/cm$^2$ for Li—S batteries. The resultant cathode exhibited a high discharge capacity around 1320 mA h g$^{-1}$ at 0.2 C rate, with long-term cyclic stability over 400 cycles (88% retention).

One way to use these highly dense polar host materials for high sulfur loading is to develop highly conductive shells that can encapsulate sulfur. For example, Zhen, L. et al. developed cathodes by encapsulating sulfur inside hollow nanospheres with sulfur loading ~1.5 mg/cm$^2$. These nanospheres have a highly conductive polar shell made of with titanium monoxide (TiO) and carbon. However, use of these specially designed hollow nanospheres as a sulfur host involves a harsh slurry-cast process with the use of inactive elements such as binders/conductive agents (10 wt % conducting carbon and 10 wt % poly(vinylidene fluoride)) and current collectors (Aluminum, usually 5-6 mg/cm$^2$). The use of these additional dead elements deteriorates the final productive capacity of packed Li—S cells at commercial scale. Second, a complex synthesis route is required for the development of these sophisticated architectures. The reported synthesis route first necessitates the formation of $PS_2TiO2/PDA$ spheres by coating TiO2/dopamine on the polystyrene (PS) sphere (template) and then centrifugation, ultrasonication, washing with ethanol and water several times and carbonization in an expensive H2/N2 (5:95) gas environment. Third, the morphology and the porosity of final cathodes after harsh slurry process and their effect on the device performance are unknown. Therefore, free-standing binder-free novel structures/architectures of these conducting polar sulfur host materials are essential for their use in the most efficacious way in Li—S batteries.

Electrospinning is a widely used technique for fabricating free-standing fiber mats on a large industrial scale. Materials such as carbon nanofibers, and their composite with metal oxides (ZnO, $MnO_2$) have been electrospun and used in Li—S batteries. However, most of the studies still develop final cathodes using harsh slurry cast process and none of these metal oxides used with 3d$^0$ or 3d$^{10}$ electronic configuration of metal centers can exhibit strong Lewis acid-base interactions due to the absence of vacant d-orbital. The present invention produces free-standing, binder-free metal monoxide nanofiber mats as porous substrate by combining both electrospinning technique and carbothermal process. The developed free-standing mats exhibited nanofibrous structures of metal oxide with protruding metal oxide nanoparticles on the surface and a high surface area of ~427 m$^2$/g. These nanofiber mats were employed as-is after sulfur infiltration as a cathode in Li—S batteries without using any additional inactive element (binders). At the same time, inter-fiber macropores allows rapid sulfur diffusion along the thickness of nanofiber mats thus allowed us to avoid harsh slurry-cast process. The cathodes based on the metal oxide nanofibers with ~2 mg/cm$^2$ (~50 wt %) sulfur loading exhibited a maximum specific capacity of ~1080 mAh/g at 0.1C, ~975 mAh/g at 0.2C and ~791 mAh/g at 0.5C rate. After initial few cycles, Li—S showed the stable capacity of ~787 mAh/g over 150 cycles at 0.2 C and ~518 mAh/g over 200 cycles at 0.5C rates, respectively. The integrated 3D conducting network of these metal oxide nanofiber mats can assure an uninterrupted electron supply during consecutive reduction/oxidation processes thus allowing Li—S to achieve long cyclic stability.

SUMMARY OF THE INVENTION

1. In one aspect, the present invention provides a nanofiber mat comprising metal oxide nanoparticles distributed on surface of the metal oxide nanofibers, wherein the nanofiber mat has a surface area of at least 150 m$^2$/g, and the metal oxide is selected from titanium monoxide $TiO_x$, wherein $0.65<x<1.25$, niobium monoxide $NbO_x$, wherein $0.982<x<1.008$, vanadium (II) oxide $VO_x$, wherein $0.79<x<1.29$, iron (II) oxide $Fe_xO$, wherein $0.833<x<0.957$, manganese (II) oxide $Mn_xO$ wherein $0.848<x<1.000$, titanium suboxide, $Ti_nO_{2n-1}$, wherein $n>1$, molybdenum suboxide, $Mo_nO_{3n-1}$, wherein $n>1$, $Mo_nO_{3n-2}$, wherein $n>1$, and vanadium suboxide, $V_nO_{2n-1}$, wherein $n>1$.

2. In the foregoing embodiment, the nanofiber mat may have a surface area of at least 250 m$^2$/g or at least 300 m$^2$/g or at least 350 m$^2$/g.

3. In each of the foregoing embodiments, the nanofiber mat may further include sulfur infiltrated into the nanofiber mat.

4. In the foregoing embodiment, the sulfur may include a conductive additive selected from the group consisting of conductive carbon powders, graphite powders, graphenes, mesoporous carbons, activated carbons, carbon nanotubes, mxenes, conductive polymers, conductive metal oxides/suboxides, metals, and any other material that conducts electrons.

5. In each of embodiments 3 and 4, the nanofiber mat may have a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the nanofiber mat.

6. In another aspect, the present invention relates to an anode including the nanofiber mat of embodiments 1 or 2.

7. In the foregoing embodiment, the anode may have a weight in the range of from about 0.1 mg cm$^{-2}$ to about 15 mg cm$^{-2}$, or from about 0.5 mg cm$^{-2}$ to about 7 mg cm$^{-2}$, or from about 1 mg cm$^{-2}$ to about 5 mg cm$^{-2}$.

8. In each of embodiments 6 and 7, the anode may have a stable discharge capacity in a range of from about 30 mAh g$^{-1}$ to about 500 mAh g$^{-1}$, or from about 100 mAh g$^{-1}$ to about 475 mAh g$^{-1}$, or from about 150 mAh g$^{-1}$ to about 400 mAh g$^{-1}$, or from about 175 mAh g$^{-1}$ to about 375 mAh g$^{-1}$ at 100 mA g$^{-1}$ current density.

9. In another aspect, the present invention relates to a cathode including the nanofiber mat of any one of embodiments 1-5.

10. In the foregoing embodiment, the cathode may have a sulfur loading in a range of from about 0.1 mg cm$^{-2}$ to about 15 mg cm$^{-2}$, or from about 0.5 mg cm$^{-2}$ to about 7 mg cm$^{-2}$, or from about 1 mg cm$^{-2}$ to about 5 mg cm$^{-2}$.

11. In each of embodiments 9-10, the cathode may have an initial discharge capacity in a range of from about 400 mAh g$^{-1}$ to about 1675 mAh g$^{-1}$, or from about 700 mAh g$^{-1}$ to about 1600 mAh g$^{-1}$, or from about 1100 mAh g$^{-1}$ to about 1500 mAh g$^{-1}$ at C/10 rate.

12. In each of embodiments 9-10, the cathode may have an initial discharge capacity in a range of from about 400 mAh g$^{-1}$ to about 1675 mAh g$^{-1}$, or from about 700 mAh g$^{-1}$ to about 1625 mAh g$^{-1}$, or from about 800 mAh g$^{-1}$ to about 1600 mAh g$^{-1}$, or from about 900 mAh g$^{-1}$ to about 1500 mAh g$^{-1}$ at C/5 rate.

13. In yet another aspect, the present invention relates to a battery including the cathode of any one of embodiments 9-12 or the anode of any one of embodiments 6-8 of the present invention.

14. hi the foregoing embodiment, the battery may be a rechargeable lithium-ion battery, a rechargeable sodium-sulfur, magnesium-sulfur, aluminum-sulfur battery, a rechargeable lithium-ion battery or a rechargeable sodium-ion battery.

15. hi yet another aspect, the present invention provides a method of producing a nanofiber mat suitable for use in an electrode of a battery from a solution of metal oxide precursor and carbon-containing polymer, comprising steps of: (a) electrospinning the solution of metal oxide into nanofibers to form a mat; (b) heating the mat at a temperature in a range of from 700° C. to 1200° C., for a time in a range of 1 to 10 hours, to produce the nanofiber mat, wherein the metal oxide precursor is selected from titanium isopropoxide Ti[OCH(CH$_3$)$_2$]$_4$, niobium ethoxide Nb$_2$(OC$_2$H$_5$)$_{10}$, vanadyl acetylacetonate C$_{10}$H$_{14}$O$_5$V, iron acetylacetonate Fe(C$_5$H$_7$O$_2$)$_3$, manganese (II) acetate tetrahydrate, and Mn(CH$_3$COO)$_2$.(H$_2$O)$_n$ where n is a non-negative integer.

16. hi the foregoing embodiment, the heating step may be conducted at a temperature in a range of from 750° C. to 1100° C., or from 800° C. to 1100° C., or from 900° C. to 1000° C. and for a period of from 3 to 8 hours, or from 4 to 7 hours, or from 5 to 7 hours.

17. In each of embodiments 15-16, the heating step may be conducted in the absence of oxygen.

18. In the foregoing embodiment, the heating step may be conducted under a nitrogen flow.

19. In each of embodiments 15-18, the carbon-containing polymers may be selected from polyvinylpyrrolidone, polyvinylpyrrolidone (PVP) (C$_6$H$_9$NO)$_n$, polyacrylonitrile (PAN) (C$_3$H$_3$N)$_n$, poly(methyl methacrylate) (PMMA) (C$_5$O$_2$H$_8$)$_n$, poly(vinyl alcohol) (PVA) (C$_4$H$_6$O$_2$)$_n$, and polyvinylidene fluoride (PVDF) —(C$_2$H$_2$F$_2$)$_n$.

20. In the foregoing embodiment, the metal oxide solution may further include a a solvent selected from anhydrous ethanol, methanol CH$_3$OH, ethanol C$_2$H$_5$OH, N,N-dimethylformamide (DMF) C$_3$H$_7$NO, chloroform CHCl$_3$, deionized (DI) water H$_2$O, toluene C$_7$H$_8$, acetic acid CH$_3$COOH, and tetrahydrofuran (THF) C$_4$H$_8$O.

21. In yet another aspect, the present invention relates to a method for making an electrode material including the steps of any one of embodiments 15-20, and further including the step of: melting sulfur on the nanofiber mat after the heating step under a pressure greater than one atmosphere; and allowing molten sulfur to diffuse onto the surface area of the nanofiber mat.

22. In the foregoing embodiment, the sulfur may include a conductive additive selected from the group consisting of conductive carbon powders, graphite powders, graphenes, mesoporous carbons, activated carbons, carbon nanotubes, mxenes, conductive polymers, conductive metal oxides/suboxides, metals and any other material that conducts electrons.

23. In any one of embodiments 21-22, the method may employ sufficient sulfur to provide a cathode having a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the nanofiber mat and the sulfur.

24. In any one of embodiments 21-23, the nanofiber mat may have a conductivity in a range of from about 10$^t$ S/cm to about 10$^5$ S/cm, or from about 10$^{-1}$ to about 10$^3$ S/cm, or from about 1 to about 10$^2$ S/cm.

25. In any one of embodiments 21-24, the sulfur may be provided in a powder form or a particle form.

26. In any one of embodiments 21-25, the step of melting the sulfur may be carried out at a temperature in a range of from about 119° C. to about 170° C., or from about 130° C. to about 160° C., or from about 140° C. to about 160° C., or from about 150° C. to about 160° C.

27. In any one of embodiments 21-26, the melting step may be carried out for a period of from about 3 to about 500 minutes, or from about 5 to about 100 seconds, or from about 5 to about 50 seconds, or from about 5 to about 30 seconds.

28. In any one of embodiments 20-27, the melting step may be carried out at a pressure in a range of from about 15 psi to about 2000 psi, or from about 50 psi to about 2000 psi, or from about 100 psi to about 1000 psi, or from about 150 psi to about 800 psi, or from about 150 psi to about 500 psi.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A shows a cross-sectional SEM image of TiO/S cathode.

FIGS. 4B, 4C, 4D, 4E, and 4F show elemental maps for the elements Ti, S, C, O, and N, respectively.

DETAILED DESCRIPTION OF THE PREFERRED EMBODIMENT(S)

Figure 1:
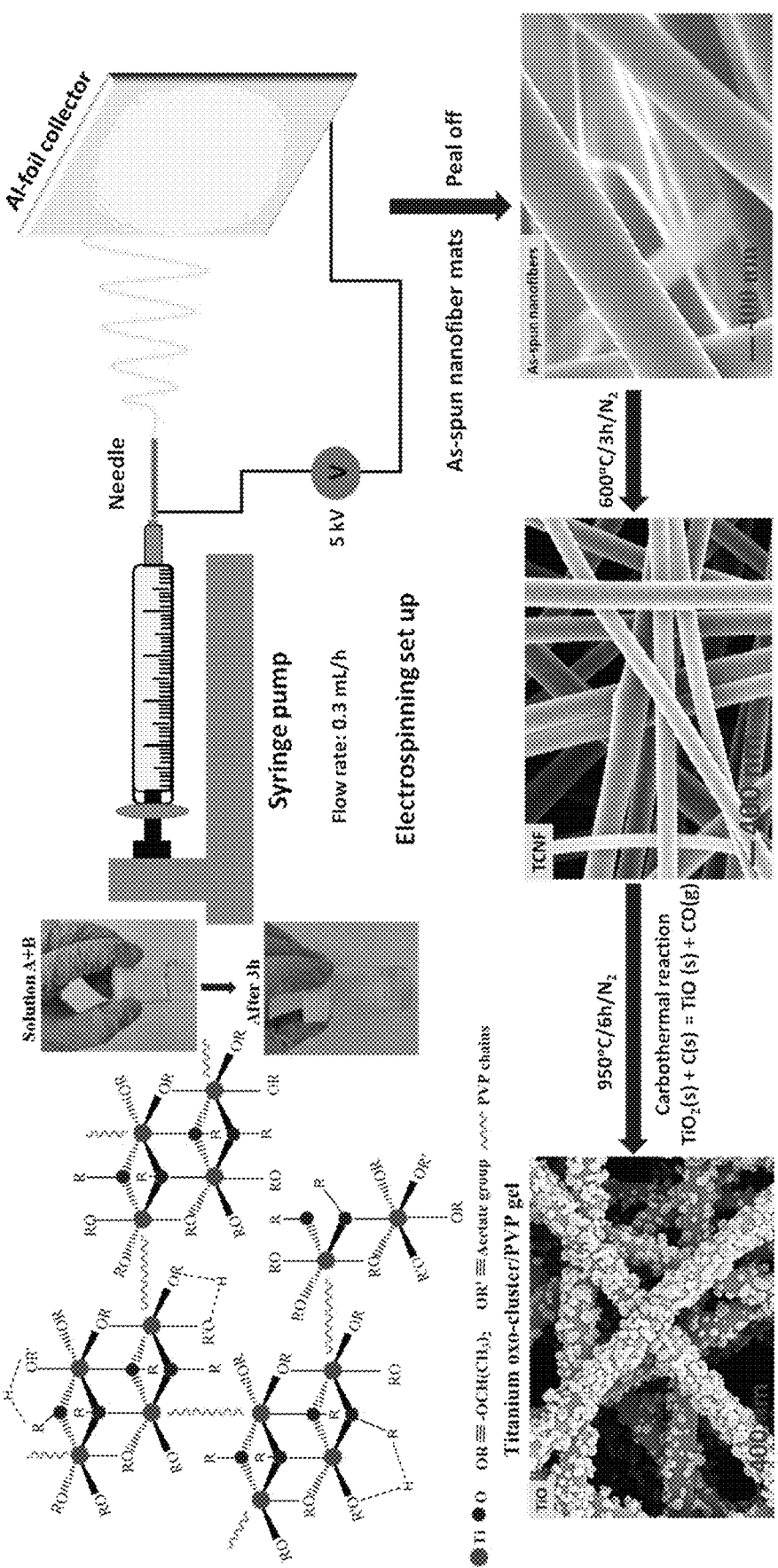
FIG. 1 shows a synthesis strategy for developing freestanding TiO nanofiber mats.

For illustrative purposes, the principles of the present disclosure are described by referencing various exemplary embodiments. Although certain embodiments are specifically described herein, one of ordinary skill in the art will readily recognize that the same principles are equally applicable to, and can be employed in other systems and methods.

It is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel methods are therefore not limited to the particular arrangement of steps disclosed herein.

As used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

The C-rate is a measure of the rate at which a battery is discharged relative to its maximum capacity. A 1C rate means that the discharge current will discharge the battery with 100% of its maximum capacity in 1 hour. For a battery with a capacity of 100 Amp-hrs, this equates to a discharge current of 100 Amps at a rate of 1C. The C-rate can be expressed in one of two ways. Thus, a C-rate of C/5 is equivalent to a C-rate of 0.2C, both of which refer to discharge of the battery with 100% of its maximum capacity in 5 hours. Similarly, a C-rate of C/2 and 0.5C both refer to discharge of the battery with 100% of its maximum capacity in 2 hours. If a battery only delivers 50% of its maximum capacity, then at a 0.5C (C/2) rate it will actually complete a discharge in only an hour, even though the current is set for C/2.

The present invention provides a nanofiber mat comprising metal oxide nanoparticles distributed on surface of metal oxide nanofibers, wherein the nanofiber mat has a surface area at least 300 m$^2$/g, and the metal oxide is selected from titanium monoxide TiO$_x$, wherein 0.65<x<1.25, niobium monoxide NbO$_x$, wherein 0.982<x<1.008, vanadium (II) oxide VO$_x$, wherein 0.79<x<1.29, iron (II) oxide Fe$_x$O, wherein 0.833<x<0.957, manganese (II) oxide Mn$_x$O, wherein 0.848<x<1.000, Ti$_n$O$_{2n-1}$, wherein n>1, Mo$_n$O$_{3n-1}$, wherein n>1, Mo$_n$O$_{3n-2}$, wherein n>1, and V$_n$O$_{2n-1}$, wherein n>1.

The nanofiber mat may have a surface area that is at least 350 m$^2$/g, or at least 400 m$^2$/g, or at least 450 m$^2$/g.

The nanofiber mat may further comprise at least some sulfur-containing component within the nanofiber mat.

The sulfur-containing component within the nanofiber mat may comprise a conductive additive selected from the group consisting of conductive carbon powders, graphite powders, graphenes, mesoporous carbons, activated carbons, carbon nanotubes, mxenes, conductive polymers, conductive metal oxides/suboxides, metals and any other material that conducts electrons.

The nanofiber mat may have a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the nanofiber mat and sulfur.

The sulfur in the nanofiber mat may contain one or more impurities.

The sulfur in the nanofiber mat may have an average particle size in a range of from 10 nm to 1000 nm, or from 20 nm to 1000 nm, or from 50 nm to 1000 nm, or from 100 nm to 1000 nm, or from 200 nm to 1000 nm.

The metal oxide nanofiber mat is porous, having porosity sufficient to allow melted sulfur to diffuse into the substrate. The porosity of the metal oxide nanofiber mat may be in a range of from about 50% to 90%, and is preferably in a range of about 70% to 85% with average pore sizes ranging from about 0.1 nanometers to about 100 microns in diameter, preferably from about 1 nanometer to about 70 microns in diameter, and most preferably from about 100 nanometers to about 50 microns in diameter. The metal oxide nanofiber mat has pore sizes in a range of 0.1 nanometer to 100 microns in diameter.

In some embodiments, the present invention provides a cathode comprising the nanofiber mat of the present invention.

The cathode may have a sulfur loading in a range of from about 0.1 mg cm$^{-2}$ to about 15 mg cm$^{-2}$, or from about 0.5 mg cm$^{-2}$ to about 7 mg cm$^{-2}$, or from about 1 mg cm$^{-2}$ to about 5 mg cm$^{-2}$.

The cathode may have an initial discharge capacity in a range of from about 400 mAh g$^{-1}$ to about 1675 mAh g$^{-1}$, or from about 900 mAh g$^{-}$ to about 1600 mAh g$^{-1}$, or from about 1100 mAh g$^{-1}$ to about 1500 mAh g$^{-1}$ at C/10 rate.

In another aspect, the cathode may have an initial discharge capacity in a range of from about 400 mAh g$^{-1}$ to about 1675 mAh g$^{-1}$, or from about 700 mAh g$^{-1}$ to about 1625 mAh g$^{-1}$, or from about 800 mAh g$^{-1}$ to about 1600 mAh g$^{-1}$, or from about 900 mAh g$^{-1}$ to about 1500 mAh g$^{-1}$ at C/5 rate.

In some embodiments, the present invention provides a battery comprising the cathode of the present invention.

The battery is a rechargeable lithium-sulfur battery or a rechargeable sodium-sulfur, magnesium-sulfur, aluminum-sulfur battery or any other battery that uses sulfur as one of the active electrode materials.

These cathodes were used as electrodes in CR2032 coin cells for electrochemical evaluation. Cathodes based on the metal oxide nanofibers with ~2 mg/cm$^2$ (~50 wt %) sulfur loading exhibited a maximum specific capacity of ~1080 mAh/g at 0.1C, ~975 mAh/g at 0.2C and ~791 mAh/g at 0.5C rate, respectively (1C=1675 mAh g$^{-1}$). These high initial discharge capacities indicate the metal oxide nanofiber mat facilitates high sulfur utilization.

The current to each cell changes slightly because it must be calculated for the exact amount of sulfur loading in the individual electrode used in the cell. If 1C=1675 mAh g$^{-1}$ for sulfur and the cathode contains 1 mg of sulfur, a 1 hr (or 1C) charging rate means using a current of 1.675 mAmps. For a cell with a cathode containing 2 mg of sulfur, a 1 hr (or 1C) charging rate would require 3.35 mAmps of current.

In some embodiments, the present invention provides a method of producing a nanofiber mat suitable as a cathode of a battery from a solution of metal oxide, comprising a step of (a) electrospinning the solution of metal oxide into nanofibers to form a mat; (b) heating the mat at a temperature in a range of from 800° C. to 1100° C. for a time in a range of 3 to 8 hours to produce the nanofiber mat, wherein the metal oxide is selected from titanium monoxide TiO$_x$, wherein 0.65<x<1.25, niobium monoxide NbO$_x$, wherein 0.982<x<1.008, vanadium (II) oxide VO$_x$, wherein 0.79<x<1.29, iron (II) oxide Fe$_x$O, wherein 0.833<x<0.957, manganese (II) oxide Mn$_x$O, wherein 0.848<x<1.000, Ti$_n$O$_{2n-1}$, wherein n>1, Mo$_n$O$_{3n-1}$, wherein n>1, Mo$_n$O$_{3n-2}$, wherein n>1, and V$_n$O$_{2n-1}$, wherein n>1.

In one aspect, the temperature at the heating step is in a range of from 850° C. to 1050° C., or from 900° C. to 1000° C.

In another aspect, the time at the heating step is in a range of 4 to 7 hours, or from 5 to 7 hours.

In yet another aspect, the heating step is conducted in an environment absence of oxygen. In one aspect, the environment absence of oxygen is under a nitrogen flow.

The method uses the metal oxide precursor having a solvent in which the metal oxide precursor is soluble. In one aspect, the solvent comprises acetic acid.

In another aspect, the solvent may further comprise anhydrous ethanol.

The method may further comprise steps of (c) melting sulfur on the nanofiber mat at a second temperature after the heating step wherein the sulfur and the nanofiber mat are under a pressure greater than one atmosphere, and (d) diffusing the molten sulfur into the nanofiber mat.

The method may use sulfur comprising a conductive additive selected from the group consisting of conductive carbon powders, graphite powders, graphenes, mesoporous carbons, activated carbons, carbon nanotubes, mxenes, conductive polymers, conductive metal oxides/suboxides, metals and any other material that conducts electrons.

The diffusing step of the method may achieve a sulfur content in a range of from about 10 wt. % to about 90 wt. %, or from about 30 wt. % to about 80 wt. %, or from about 30 wt. % to about 70 wt. %, or from about 40 wt. % to about 60 wt. %, or from about 45 wt. % to about 55 wt. %, based on a total weight of the nanofiber mat and sulfur.

The method produces the nanofiber mat having a conductivity in a range of from about 10$^{-3}$ S/cm to about 10$^5$ S/cm, or from about 10$^{-1}$ to about 10$^3$ S/cm, or from about 1 to about 10$^2$ S/cm.

The method may use sulfur in a powder form, or particle form. In one aspect, the sulfur contains one or more impurities.

The method may use a temperature in the melting step in a range of from about 119° C. to about 170° C., or from about 130° C. to about 160° C., or from about 140° C. to about 160° C., or from about 150° C. to about 160° C.

The method may have the melting step carried out for a period of from about 3 to about 500 minutes, or from about 5 to about 100 seconds, or from about 5 to about 50 seconds, or from about 5 to about 30 seconds.

The pressure at the melting step of the method is in a range of from about 15 psi to about 2000 psi, or from about 50 psi to about 2000 psi, or from about 100 psi to about 1000 psi, or from about 150 psi to about 800 psi, or from about 150 psi to about 500 psi.

The sulfur used in the method of the invention may have some impurities. The sulfur may be precipitated sulfur, sulfur produced using any method or another type of commercially available sulfur. Impurities in the sulfur normally do not have a significant impact on the electrode performance, although the size of the sulfur particles on the electrically conductive substrate at the start of the heating step may influence the parameters of the heating step. For example, the required heating time and/or temperature may be lower when employing nano-sulfur, as compared to larger particles of other types of commercially available sulfur.

In the method additional functional components may be blended with sulfur. One type of the functional components are conductive additives such as carbon black, carbon nanotubes, activated carbon, mesoporous carbon, graphite powder, mxenes, conductive polymers, metal oxides, or conductive suboxides. For example, conductive carbon powder can be blended into the sulfur to introduce more conductivity and improve interfaces between sulfur and electron-transport surfaces.

In some embodiments, conductive additives may be added for the purpose of improving the utilization of the sulfur.

The sulfur may be heated to any temperature within the melt range of sulfur, namely from about 119° C. to about 170° C. The ultimate temperature of the sulfur may, depend on the heating time. In some embodiments, heating may be a rapid process, and the temperature is preferably in the range of from about 130° C. to about 160° C., or preferably from about 140° C. to about 160° C., or more preferably from about 150° C. to about 160° C. In other embodiments, the heating in the melting step may be a slower process and the temperature may be lower, such as in the range of from about 120° C. to about 150° C., or preferably from about 125° C. to about 140° C., or more preferably from about 130° C. to about 140° C.

Melting and diffusion of the sulfur into the metal oxide nanofiber mat may take from as little as 3 seconds, to as long as about 500 seconds. The time needed is partially dependent on the size and/or surface area of the sulfur particles, as well as the pore size and/or the thickness of the mat. Larger pore sizes in the substrate allow more rapid diffusion of sulfur into the metal oxide nanofiber mat, thus the heating time may be shorter. Thicker mats may require a longer time for the sulfur to diffuse throughout the substrate, and thus the heating time may need to be longer. In some embodiments, the time for heating and diffusion of the sulfur into the metal oxide nanofiber mat may be in a range of from about 5 seconds to about 100 seconds, or from about 5 seconds to about 50 seconds, or from about 5 seconds to about 30 seconds.

The heating time and temperature are inversely correlated. For example, when the temperature is higher, the heating time is reduced. When the temperature is lower, the heating time is increased. In one embodiment, the heating temperature is 120° C., and sulfur is melted and diffused into electrically conductive carbon nanofibers in about 60 seconds.

In some embodiments, the melting step may be conducted at a pressure in a range of from about 15 psi to about 2000 psi. The desired pressure is dependent on the pore size, porosity, and thickness of the nanofiber mat. Preferably, the pressure is in a range of from about 15 psi to about 2000 psi or from about 50 psi to about 2000 psi, or from about 100 psi to about 1000 psi, or from about 150 psi to about 800 psi, or from about 150 psi to about 500 psi. Elevated pressure can be used to reduce diffusion time and ensure diffusion of the sulfur throughout the nanofiber mat.

In one embodiment, a powdered sulfur is place on the nanofiber mat and heated under pressure for a time of about 3-6 seconds, or about 4-5 seconds to rapidly melt and diffuse the sulfur into the nanofiber mat. This produces a device-ready electrode that is free of binder or additional current collectors.

The cathode of the present invention has a high specific capacity, good cyclic stability and desirable rate performance because of (a) good electrical conductivity of metal oxide nanofibers, (b) inherent conducting pathways provided by the robust binder-free nanofibers for uninterrupted electron supply, (c) facile transportation of the electrolyte due to inter-fiber macropores, (d) simultaneous presence of strong Lewis acid-base interactions between metal oxide and soluble lithium polysulfides and weak polar-polar interactions. Moreover, the cathodes bestow the advantage of free-standing nature thus eliminating the need for binders, current collectors and conducting additives. The additional dead weight of all these materials ultimately has a detrimental effect on the total device capacity. At the same time, inter-nanofiber macropores of nanofibers allow sulfur to diffuse rapidly along the thickness of the cathodes within just 5 seconds. Thus, free-standing metal oxide nanofiber mats allowed the elimination of the use of harsh slurry cast processes for sulfur infiltration and cell assembly.

The cathodes of the present invention may be used in lithium-sulfur or sodium-sulfur batteries. Such lithium-sulfur batteries have high discharge capacities in a range of from about 1200 mAh $g^{-1}$ to about 1675 mAh $g^{-1}$, or preferably from about 1400 mAh $g^{-1}$ to about 1625 mAh $g^{-1}$, or more preferably from about 1500 mAh $g^{-1}$ to about 1600 mAh $g^{-1}$. These lithium-sulfur batteries also have an energy density in a range of from about 1800 Wh $kg^{-1}$ to about 2500 Wh $kg^{-1}$, or preferably from about 2000 Wh $kg^{-1}$ to about 2400 Wh $kg^{-1}$, or more preferably from about 2200 Wh $kg^{-1}$ to about 2300 Wh $kg^{-1}$.

The battery with the cathode may be conditioned by running the battery at a C-rate of from C/20 to C/10 for one cycle. Alternatively, the battery may be conditioned by running the battery for: (i) one cycle at C-rate of from C/10 to C/5; (ii) one cycle at a C-rate of from C/5 to C/2; and (iii) one cycle at a C-rate of from C/2 to C/1.

In one embodiment where the metal oxide is TiO. The mechanism of the interaction of the TiO with lithium polysulfides during the Li—S cell operation was explored through post-mortem X-ray photoelectron spectroscopy (XPS) studies. It was discovered that TiO/S cathodes chemically bind soluble lithium polysulfides through strong Lewis acid-base interactions between terminal sulfur ($S_T$) of lithium polysulfides ($S_x^{2-}$) and unsaturated Ti-centers in TiO nanofibers.

In summary, the metal oxide nanofiber mat is free-standing and binder-free, has a high BET surface area (~427 $m^2/g$), good electrical conductivity and a coarse surface with micro/mesoporosity. The nanofiber mats not only can moderate the diffusion of lithium polysulfides via unsaturated metal-centers but also enhance the redox kinetics of sulfur. The cathodes were developed using rapid melt sulfur infiltration techniques to eliminate the need for inactive elements. Besides leading to a high capacity, and excellent cycling stability, the free-standing metal oxide nanofiber mats have also shown robustness due to their mechanically stable continuous 3D conducting network. XPS analysis showed the presence of strong Lewis acid-base interactions with metal oxide, which are crucial to moderate the shuttling effect in Li—S batteries. This invention overcomes the restriction on the use of highly dense powdered Ti-based suboxides/monoxide or similar polar host materials at higher S-loading in Li—S batteries.

EXAMPLES

The following examples are illustrative, but not limiting of the methods and compositions of the present disclosure.

1. Fabrication of TiO Nanofiber Mats

Electrospinning was used to fabricate free-standing TiO nanofiber mats. First, solution A was prepared by dissolving 0.7 g PVP into 3.75 mL anhydrous ethanol (Alfa Assar) and stirring at room temperature until the solution became transparent. Solution B was made by adding 0.75 mL titanium isopropoxide (TIP) into a mixed solution of 1 mL ethanol and 2 mL glacial acetic acid. Solution B was then added to solution A and stirred at room temperature for 3 h. Due to the Lewis acidity of the $Ti^{4+}$-centers and Lewis basicity of the alkoxide groups, TiP tends to form oligomers $[Ti(OR)_4]_n$, i.e., aggregates (coordination number 6) via alkoxo-bridges. Consequently, ethanol was used as a solvent. The interaction of ethanol (Lewis base) solvent with $Ti^{4+}$-centers competes against alkoxo-bridge formation and thus minimizes the degree of aggregation. TiP is susceptible to nucleophilic attack by humidity and produces ill-defined titanium-oxo/hydroxo precipitates via a premature hydrolysis/condensation reaction. Therefore, acetic acid was also used as a co-solvent with anhydrous ethanol to slow down the hydrolysis. Acetic acid substitutes a fraction of alkoxide groups of TiP with acetate groups thereby helping to suppress undesirable precipitation. Moreover, the cross-linking between PVP and $Ti^{4+}$-centers provides cohesion between these formed oxo-titanium clusters and polymer chains and results in a clear yellow-colored gel after 3 h stirring. This yellow-colored gel was then electrospun at room temperature directly onto an Al-foil collector using a 22-gauge stainless steel needle (Hamilton Co.). The distance between the grounded Al-foil collector and the needle tip was kept at ~15 cm. The flow rate of the gel solution and applied potential were 0.3 ml/h and ~5 kV, respectively. The as-spun nanofiber mats were then heat treated at 950° C. for 6 h at a heating rate of 3.5° C./min under a steady nitrogen flow in a horizontal quartz tube furnace. Nanofiber mats were also heat-treated at 600° C. for 3 h to produce reference $TiO_2$/CNFs samples.

2. Physical Characterization of the Prepared Samples

The crystallographic phase formation of the samples was confirmed by analysing X-ray diffraction (XRD) patterns collected on an X-ray diffractometer (Rigaku SmartLab). A field emission scanning electron microscope (FE-SEM) (650 SEM, FEI Quanta) equipped with an energy dispersive spectrometer (EDS) for elemental mapping was used for observing microstructural/morphological characteristics. Thermogravimetric analysis of all the samples was carried out under steady air flow at a heating ramp rate of 5° C./min. The conductivity of the freestanding TiO, $TiO_2$/CNF and CNF mats was measured using a linear four-probe method on 2×1 $cm^2$ sized samples. The X-ray photoelectron spectroscopy (XPS) measurements were performed on a Physical Electronics VersaProbe 5000 spectrometer equipped with monochromated Al $K_\alpha$ excitation source. All the core level spectra were charge-corrected with respect to the binding energy of the C 1s peak position (284.6 eV). CASAXPS software was used for peak fitting of the spectra with Shirley background. Nitrogen adsorption-desorption analysis of the freestanding TiO nanofiber mats was performed at 77 K on an automated gas sorption analyzer (AutoSorb iQ2, Quantachrome Instruments). The sample was degassed for overnight at 200° C. under N2 flow prior to analysis.

3. Li—S Coin Cell Assembly and Electrochemical Characterizations

Commercial sulfur (Sigma, 100 mesh) was used for cathode preparation without further treatment. The TiO nanofiber mats were punched (with 11 mm diameter punch) into discs and /\47-52 wt % sulfur (1.8-2.0 mg/$cm^2$) was infused in the final TiO/S cathodes using the rapid sulfur melt infiltration technique. The TiO/S cathodes were flipped so that the sides of the cathodes where sulfur was infused were facing away from the separator. The CR2032 coin-type Li—S cells were assembled using TiO/S cathodes (/\0.855 $cm^2$ area), lithium foil anodes (Aldrich; 11 mm diameter), polypropylene separators (Celgard 2500; 19 mm diameter), and nickel foam spacers along with a blank (20 μL) electrolyte. The blank electrolyte was made with 1.85 M $LiCF_3SO_3$ (Acros Organics), and 0.1 M $LiNO_3$ (Acros Organics) salts in a mixture of 1,2-dimethoxyethane (DME, Acros Organics) and 1,3-dioxolane (DOL, Acros Organics) at a 1:1 volume ratio. The assembled coin cells were held at rest at their open circuit potential for 3 hours to equilibrate them before running electrochemical experiments. Cyclic voltammetry at a 0.05 mV/s scan rate between voltages of 1.8-2.6 V and electrochemical impedance spectroscopy (EIS) in the frequency range of 0.01 Hz to 100 kHz with an AC perturbation of 5 mV amplitude were performed using a potentiostat (Gamry reference 1000). Prolonged cyclic stability tests were carried out with a MACCOR (4000 series) battery cycler at different C-rates (where 1C=1675 mAh $g^{-1}$) at voltages of 1.8-2.6 V. Li—S cells were conditioned during the first cycle at a 0.1C rate before cycling them at a 0.2C rate. Similarly, Li—S cells were conditioned at 0.1C and 0.2C rates, respectively for the first and second cycles before prolonged cycling at a 0.5C rate.

Continuous fibers were produced by electrospinning a yellow-colored gel of TiP/PVP in ethanol/acetic acid solvent using the method shown in FIG. 1. The as-spun nanofiber mats were then heat treated at 600° C. and 950° C. to prepare $TiO_2$/CNFs (denoted as TCNF) and TiO samples. The SEM image of the as-spun sample depicting non-woven nanofibrous structures with an outer diameter of about 300 to 600 nm is shown in FIG. 1. After heat treatment at 600° C. for 3 h in nitrogen, a nanofibrous structure with a smooth surface was conserved, and the TiP/PVP nanofibers were transformed to a fully carbonized TCNF sample. Thus, to some extent, the TCNF can be viewed as an intermediate product for TiO synthesis with $TiO_2$ nanoparticles embedded within the carbon nanofibers.

Figure 2A:
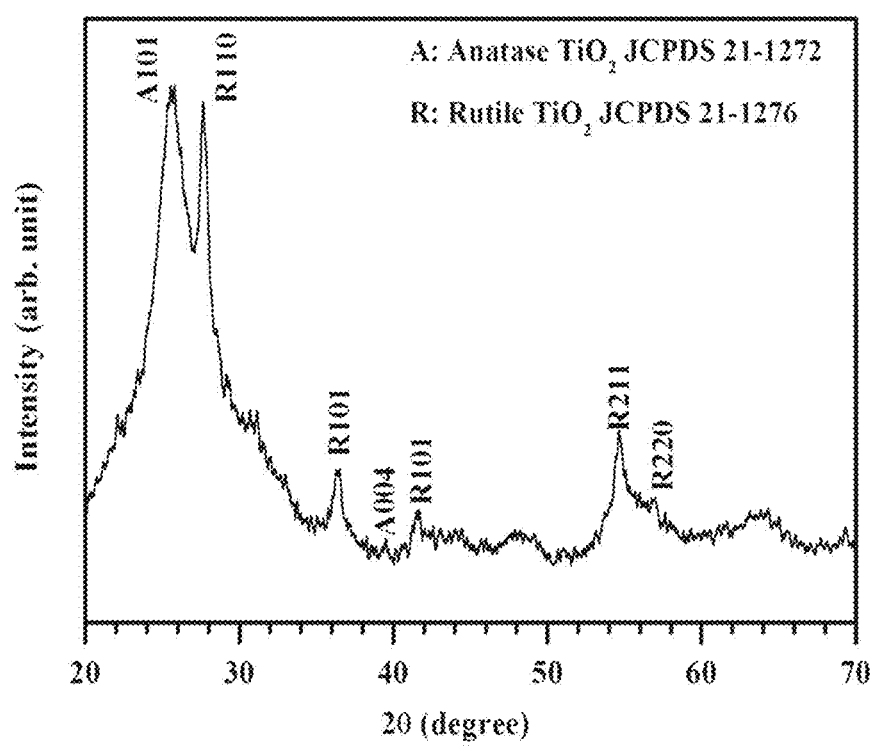
FIG. 2A shows X-ray diffraction (XRD) patterns for TiO$_2$/CNF (TCNF).
Figure 2B:
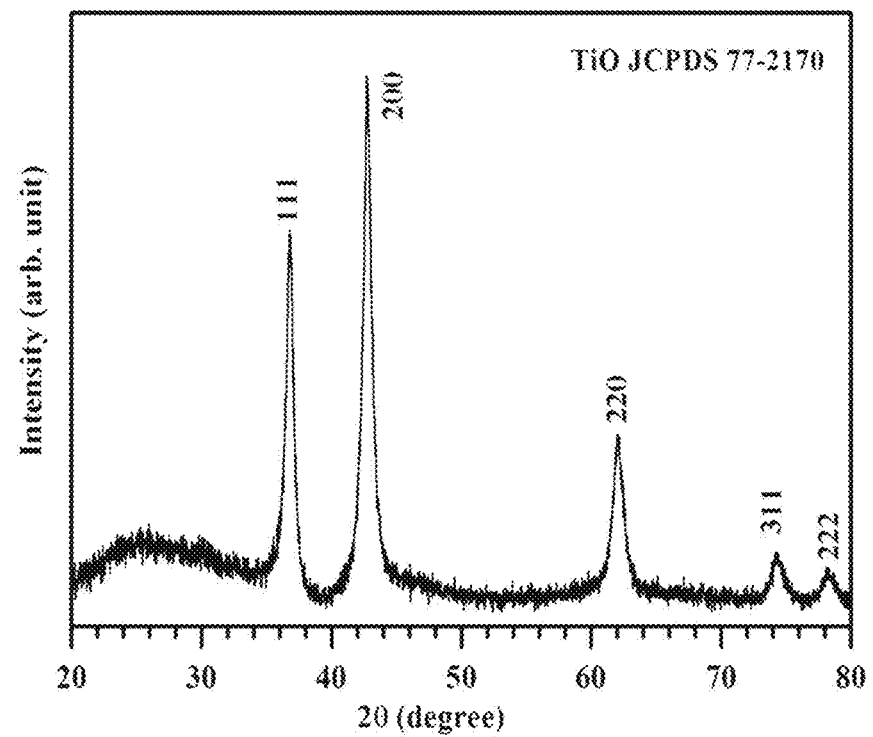
FIG. 2B shows XRD patterns for TiO.

To reduce $TiO_2$ to TiO via carbothermal reaction, the TCNF sample was further heated at 950° C. for 6 h under a steady nitrogen gas flow. The SEM image (FIG. 1) revealed that the fibrous structures of the TiO sample were still maintained, however, the surface became coarser with nanoparticles protruding from the surface of the nanofibers. The fiber diameter of the TiO samples did not significantly change upon heat treatment because of the residual carbon in the TiO sample, which provides an inherent scaffold that may prevents collapse of the final TiO nanoparticles upon heat treatment and CO removal. Further, XRD patterns of both of the TCNF and TiO samples were collected and analyzed to investigate information about crystal structure as shown in FIGS. 2A-2B. The XRD pattern of the TCNF sample exhibited two strong reflections at 2θ, at ~25.54° and ~27.71°, which correspond to tetragonal anatase (101) (JCPDS card no 21-1272) and rutile (110) (JCPDS card no 21-1276) planes. Upon heating to a temperature ≥400° C., irreversible anatase to rutile (ATR) phase transition was expected. However, depending on various parameters including particle size, particle shape (aspect ratio), heating rate, atmosphere, etc., the transition may be incomplete. It is believed that incomplete ATR transition resulted in the presence of both anatase and rutile polymorphs. All other observed XRD peaks were also indexed to anatase/rutile phases of $TiO_2$ as shown in FIG. 2A. A broad hump observed between 2θ at ~20-30° is due to the presence of amorphous carbon in the TCNF sample.

The TiO based nanofibers have better wettability/accessibility, good mechanical stability, and there is no need for a binder/current collector.

Figure 2C:
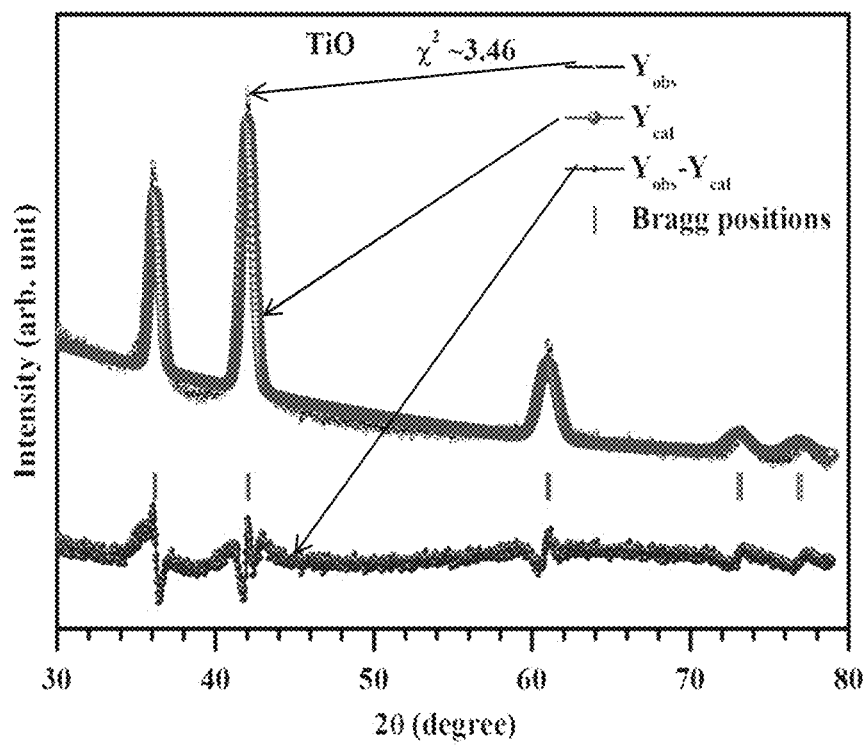
FIG. 2C shows Rietveld refinement for XRD pattern of TiO sample.
Figure 2D:
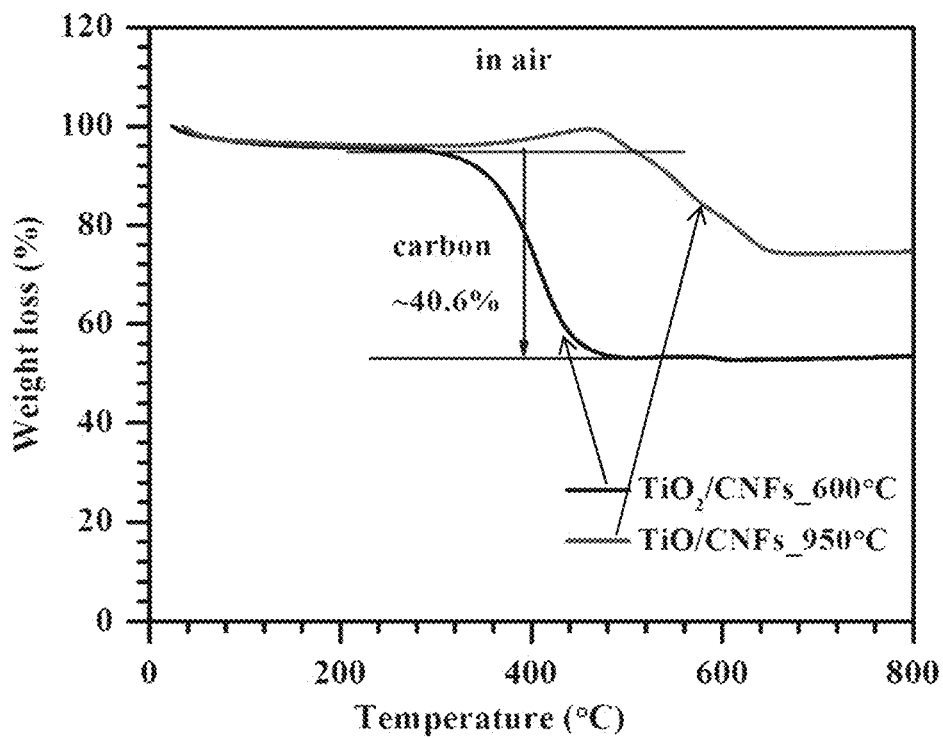
FIG. 2D shows thermogravimetric analysis (TGA) curves for TCNF and TiO samples in the air.

In FIG. 2B, the XRD pattern of the TiO sample shows the emergence of new peaks at 2θ~36.8°, 42.7°, 62.1°, 74.3°, and 78.3°. These reflections are consistent with (111), (200), (220), (311) and (222) planes of the crystalline TiO phase, respectively according to JCPDS card no 77-2170. A small hump between 2θ~20-30° is still observed indicating the presence of residual amorphous carbon in the final TiO nanofibers. The absence of tetragonal anatase/rutile phases indicates the complete reduction of $TiO_2$ to TiO via carbothermal reaction. TiO is a nonstoichiometric compound with a significant amount of disordered vacancies (14-15%) in both oxygen and metal sublattices. These oxygen vacancies can also potentially be in an ordered state and allow TiO to form various superlattices (for example, cubic $Ti_5O_5$ or monoclinic $Ti_5O_5$). Therefore, Rietveld refinement was performed as shown in FIG. 2C, to investigate whether the synthesized sample was TiO (more accurately $TiO_y$) with disordered vacancies or $Ti_5O_5$ superlattice (possibly formed during heat treatment). The cell parameter 'a' obtained from the refinement is 4.29362 Å, which indicates the presence of cubic TiO (fm-3 m space group) phase with disordered vacancies. Thermogravimetric analysis (TGA) showed 40.6 wt % of carbon in the TCNF sample as given in FIG. 2D, which is confirmed by the above-mentioned XRD results. Reduced carbon content in the TiO sample is due to utilization of the carbon in the carbothermal reaction during $TiO_2$ reduction.

Figure 3A:
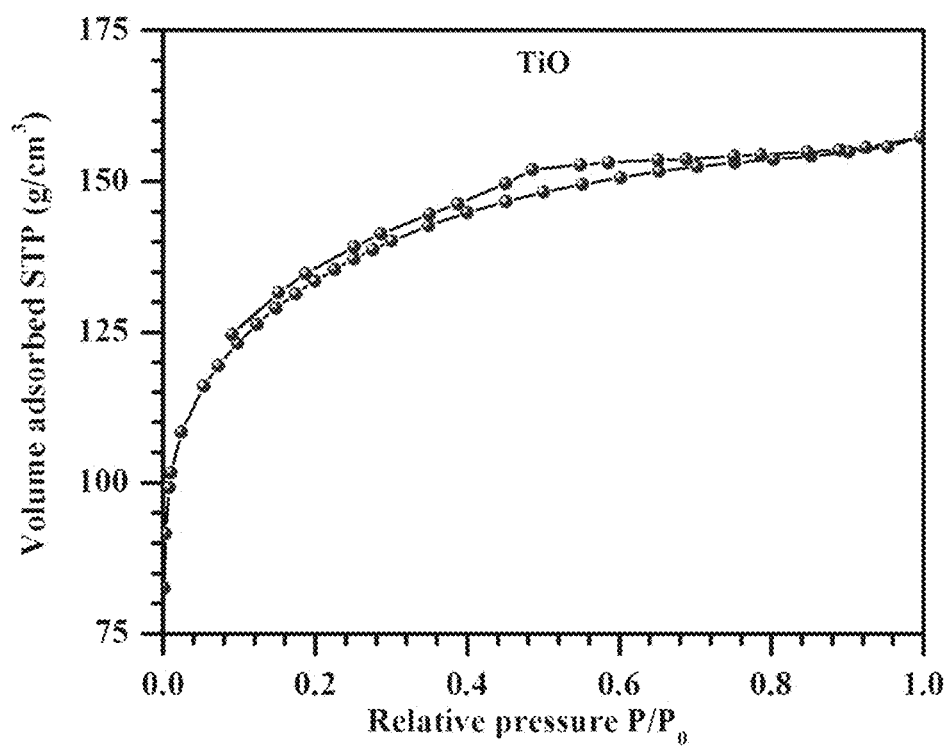
FIG. 3A shows a N$_2$ adsorptions-desorption curve for a TiO sample.
Figure 3B:
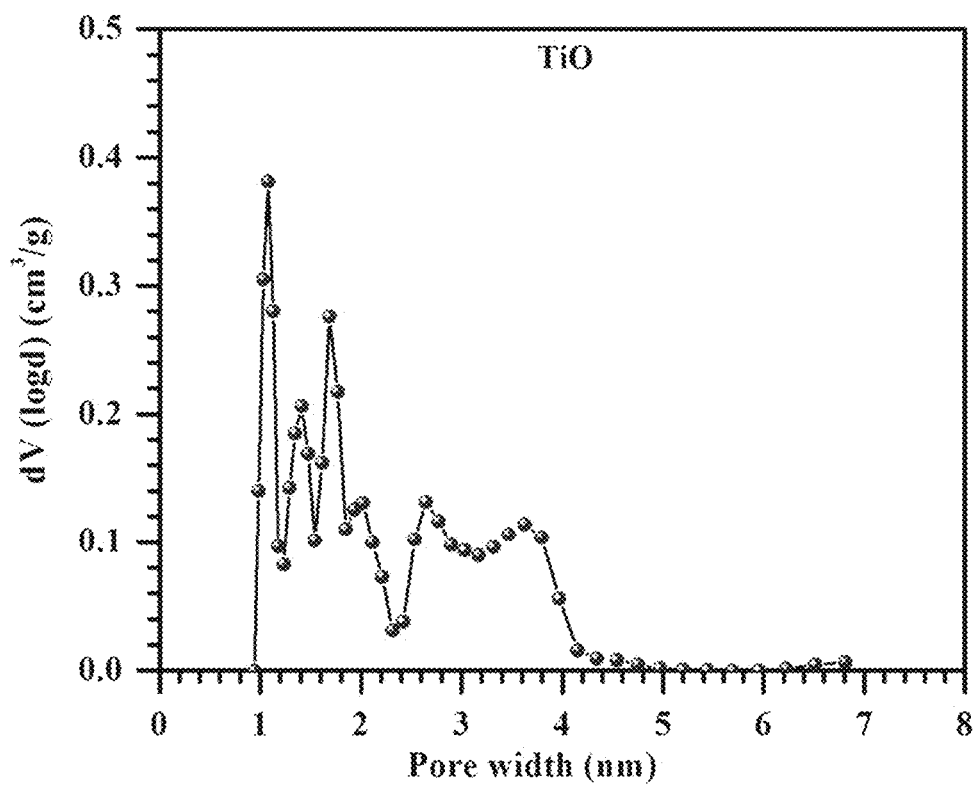
FIG. 3B shows a pore size distribution curve for a TiO sample.

FIGS. 3A-3B show the $N_2$ absorption-desorption isotherm plot and pore size distribution for the TiO sample. As the pressure increased, the amount of adsorbed gas first rose sharply and then remained nearly constant at intermediate pressures (FIG. 3A) suggesting slit-shaped pores with a majority of micropores along with a small amount of mesopores in the TiO sample.

TABLE 1

Parameters of porous texture-surface area and pore volume

| | $N_2$ at 77K | | | | |
|---|---|---|---|---|---|
| Sample | $S_{BET}$ ($m^2/g$) | $V_t$ ($cm^3/g$) | $V_{meso}$ ($cm^3/g$) | $V_{<1 nm}$ ($cm^3/g$) | $V_{mic}$ ($cm^3/g$) |
| TiO | 427 | 0.244 | 0.064 | 0.130 | 0.180 |

The surface area ($S_{BET}$) and pore volumes ($V_t$—total pore volume; $V_{mic}$—micropore volume; $V_{meso}$—mesopore volume and volume of pores less than 1.0 nm ($V_{1nm}$)) were determined by $N_2$ adsorption at 77K using a non-local density functional theory (NLDFT) model. It can be seen from the pore size distribution plots in FIG. 3B that the diameters of a large fraction of the pores are below 5 nm, which indicates the presence of micropores and small mesopores. The calculated total pore volume and micropore volumes are ~0.244 and 0.180 $cm^3/g$, respectively. This micro/mesoporosity is most likely due to PVP decomposition, packing of the different TiO crystallites, and at the same time, CO removal from the sample during the carbothermal reaction. The TiO sample has shown a high BrunauerEmmettTeller (BET) surface area of $\wedge 427$ $m^2/g$. The electrical conductivities of the CNFs, TCNF and TiO samples were measured by a linear four-probe method on 2×1 $cm^2$ sized samples. The relation used to calculate electrical conductivity is given below:

$$\sigma = \frac{1}{\rho}; \rho = \frac{V}{I} C$$

where ρ is the electrical resistivity, V is the applied voltage, I is the measured current, and C is the correction factor associated with the dimensions of the sample. The correction factor for the present case was ~0.9727. The measured electrical conductivities of the CNFs, TCNF and TiO nanofiber mats were 0.86, 6.69*$10^{-3}$, and 1.1 S/cm, respectively.

The TiO/S cathodes were prepared using a rapid melt sulfur infiltration technique. A desired amount of sulfur was sprinkled homogeneously across the tops of punched TiO disk electrodes (punched using an 11 mm diameter punch) and then heat pressed at 140° C. for 5 seconds at a pressure of not more than 250 psi). Rapid heating using a hydraulic heat press (preheated at 140° C.) allows sulfur to diffuse throughout the nanofiber mats. The content of the sulfur was kept 47-52 wt % (S loading of 1.8-2.0 $mg/cm^2$) in the final TiO/S composite. The cross-sectional SEM image of the TiO electrode after sulfur infiltration and elemental maps for the expected elements (Ti, O, C, N, and S) are given in FIGS. 4A-4F. It can be seen from the elemental maps that sulfur is evenly distributed along the thickness of the nanofibers mats.

Figure 5:
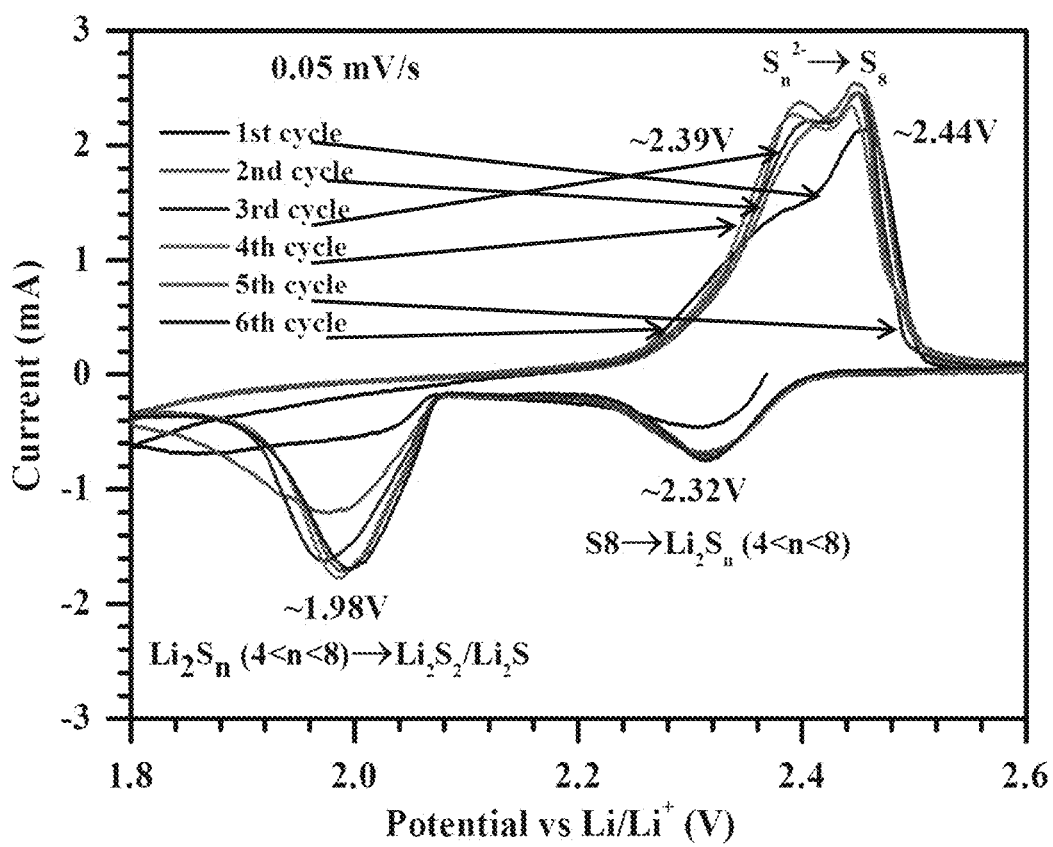
FIG. 5 shows cyclic voltammetry (CV) curves at 0.05 m V/s scan rate for TiO/S cathode-based Li—S cells.
Figure 9A:
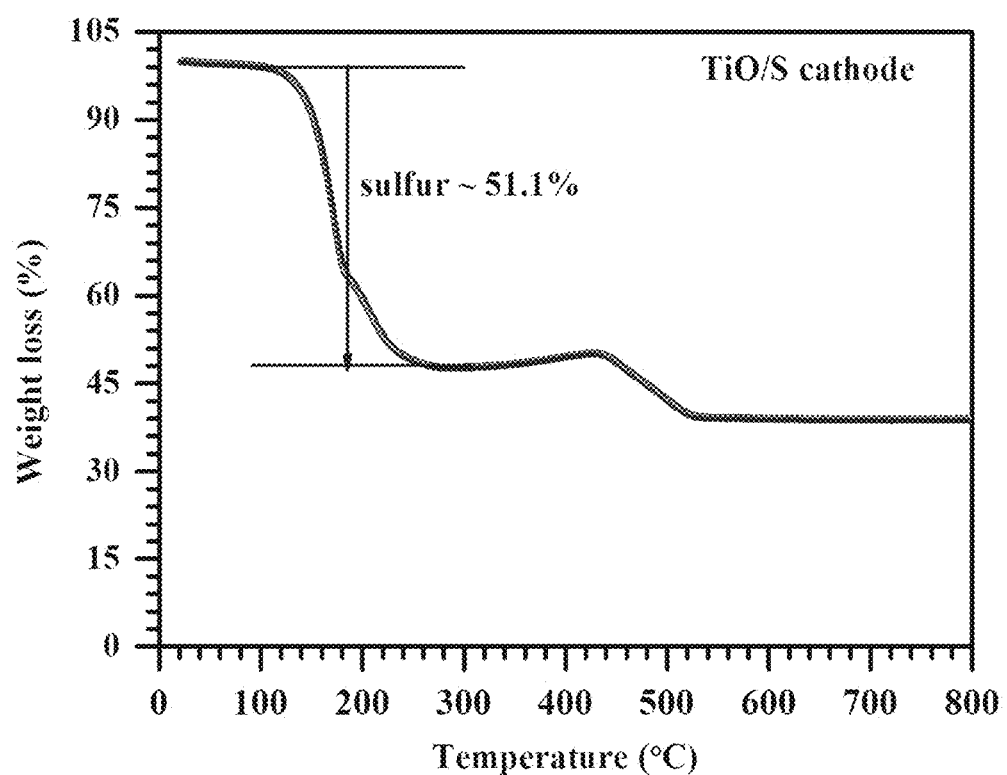
FIG. 9A shows a TGA curve for TiO/S cathode in air.
Figure 9B:
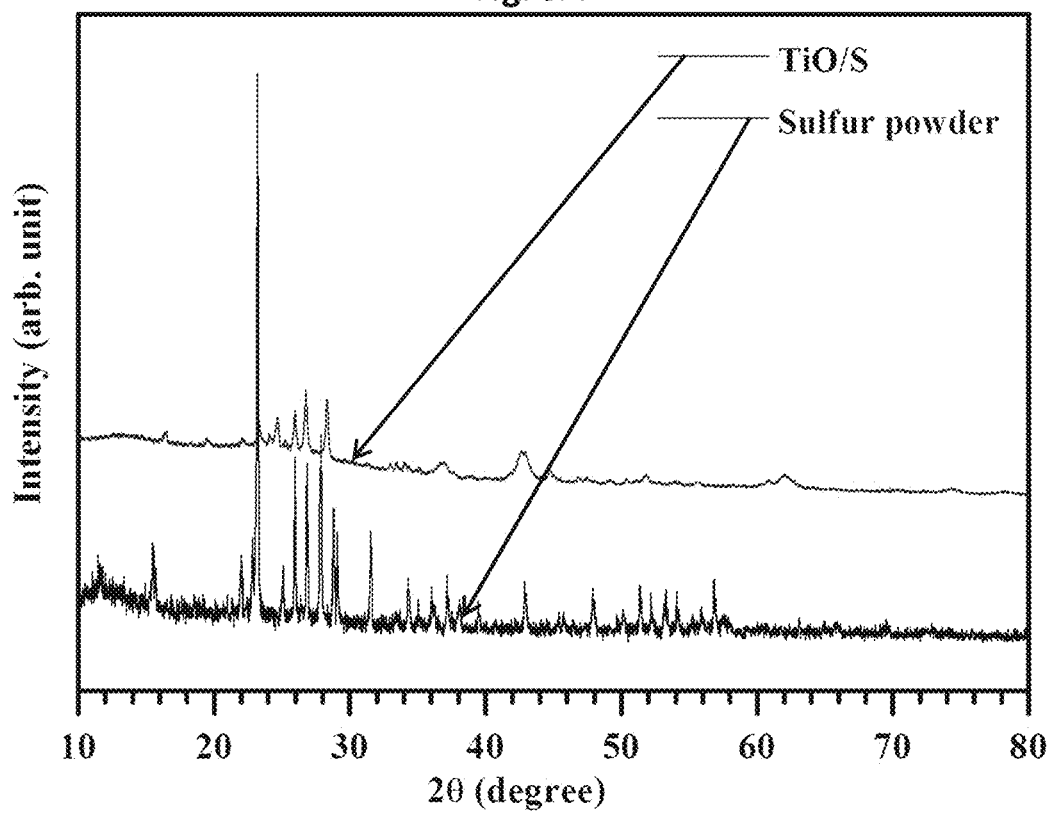
FIG. 9B shows XRD patterns for a TiO/S cathode and commercial sulfur powder.
Figure 10:
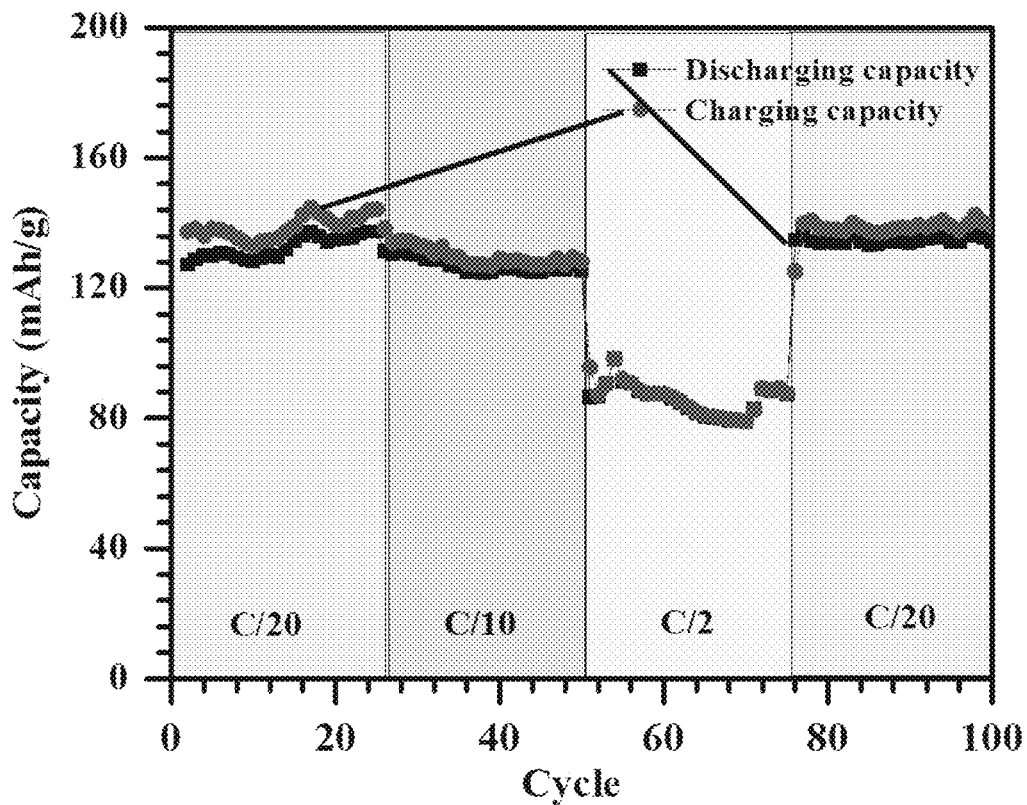
FIG. 10 shows the rate capability of an Na-ion battery assembled with a free-standing NbO electrode (mass 1.4 mg) as anode and Na-metal as cathode.
Figure 11:
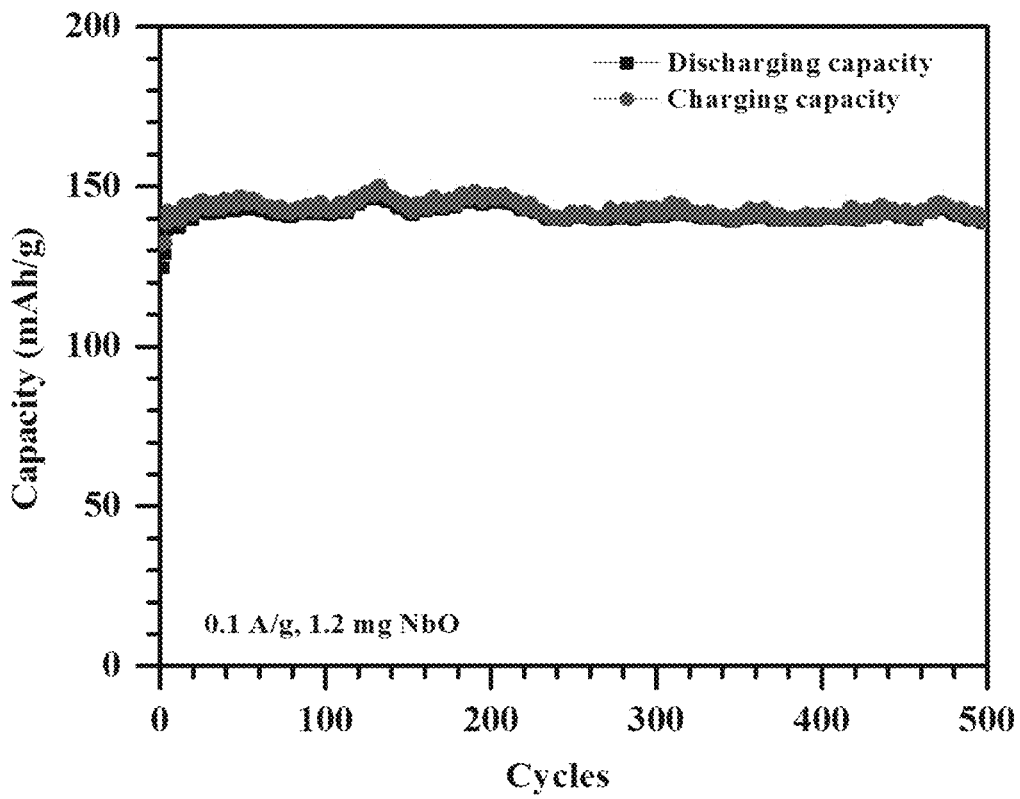
FIG. 11 shows the cyclic stability of an Na-ion battery assembled with a free-standing NbO electrode mass (1.20 mg) as anode and Na-metal as cathode.
Figure 12:
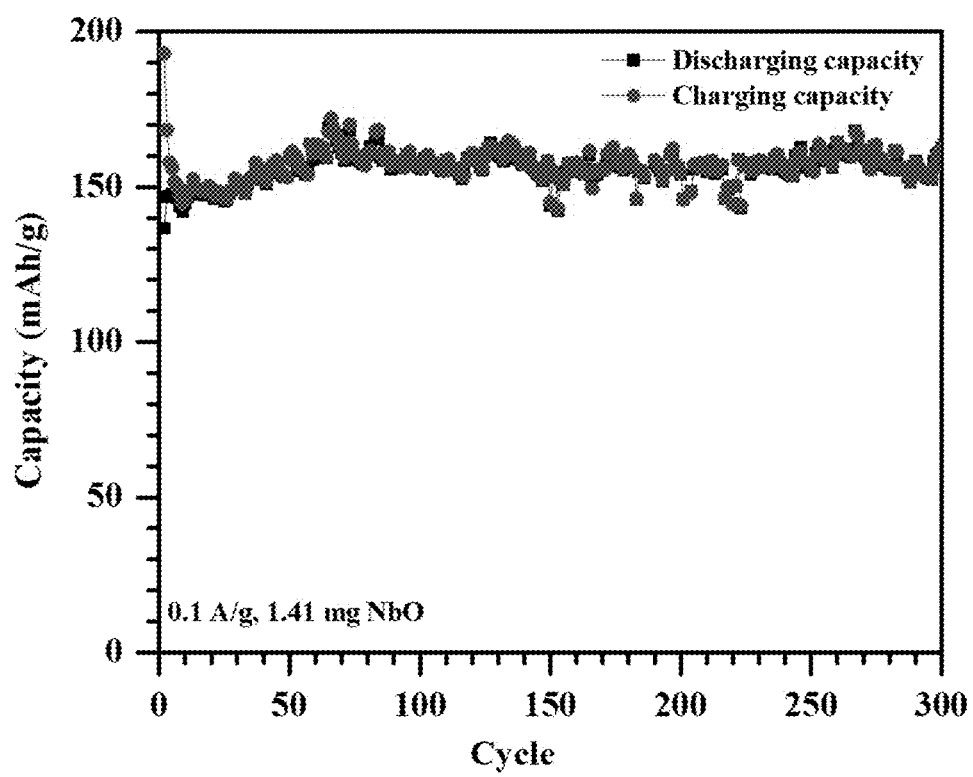
FIG. 12 shows the cyclic stability of a Li-ion battery assembled with a free-standing NbO electrode (mass 1.41 mg) as anode and Li-metal as cathode.
Figure 13:
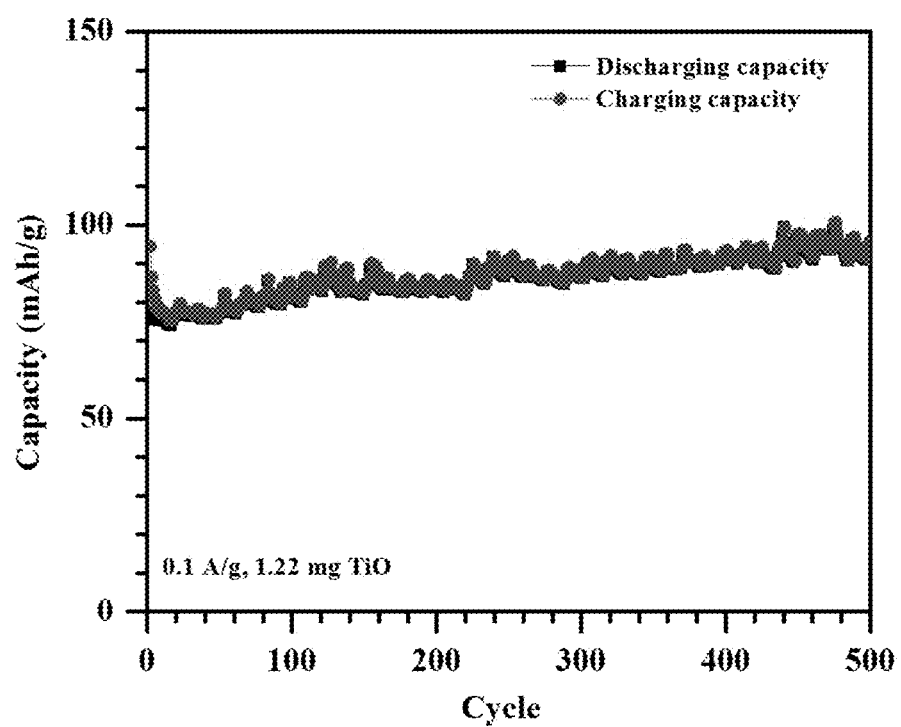
FIG. 13 shows the cyclic stability of a Li-ion battery assembled with a free-standing TiO electrode (mass 1.22 mg) as anode and Li-metal as cathode.
Figure 14:
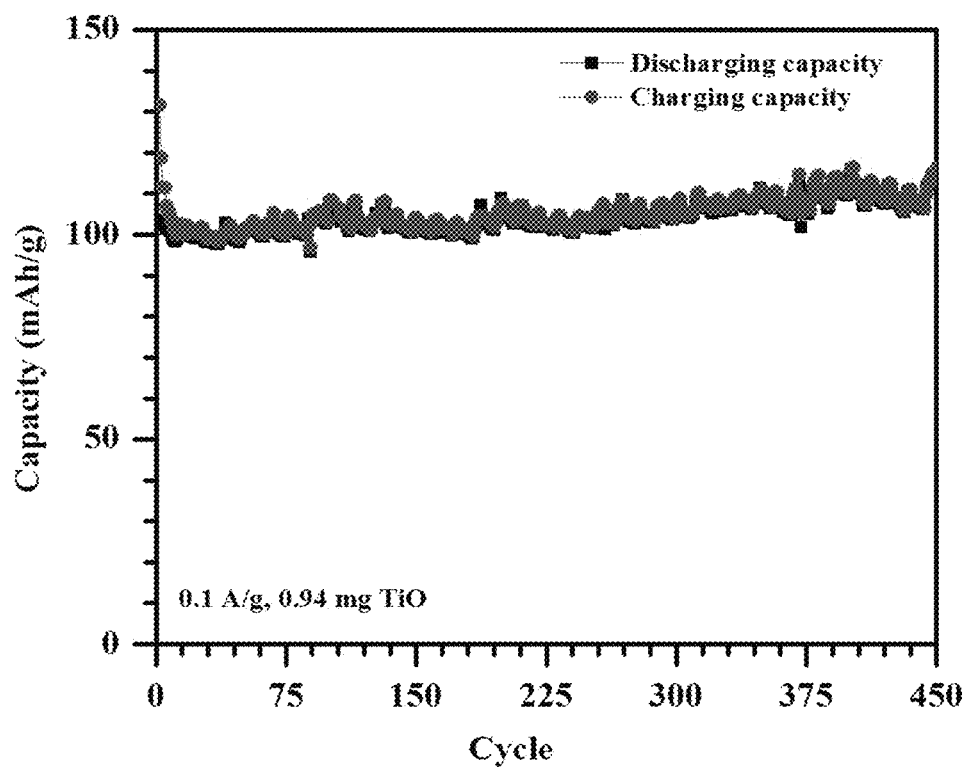
FIG. 14 shows the cycling stability of a Li-ion battery assembled with a free-standing TiO electrode (mass 0.94 mg) as anode and Li-metal as cathode.

The TGA curve of the final TiO/S sample confirmed a content of ~51 wt % sulfur thus further corroborating the sulfur content (measured from weight difference before and after infiltration) in the TiO/S cathode (supplementary FIG. 9A). The XRD pattern of the TiO/S cathode also proves the presence of TiO and sulfur after heat treatment (supplementary FIG. 9B). After preparation and characterization, these freestanding TiO/S cathodes were used as is in Li—S batteries without any binders or a current collector. The electrochemical behaviour and reversibility of the TiO/S cathode were investigated by cyclic voltammetry. The observed cyclic voltammetry (CV) curves of TiO/S based Li—S cells at 0.05 mV/s scan rate are shown in FIG. 5. The CVs of the TiO/S exhibited two cathodic peaks and a broad anodic peak. The two reduction (cathodic) peaks, starting at ~2.4V (centered at ~2.32 V) and ~2.06V (centered at ~1.98 V), respectively, represent two-step reduction of elemental sulfur (Ss) to first intermediate soluble lithium polysulfides ($Li_2S_n$; 8≥n≥4) and then to solid state insoluble $Li_2S_2/Li_2S$.

In the anodic scan, a broad oxidation peak between voltages of ~2.23-2.5V was observed during the first cycle, which corresponds to oxidation of the reduced $Li_2S_2/Li_2S$ product to elemental $S_8$ via soluble intermediate polysulfides. In subsequent scans, this broad anodic peak can be seen as two overlapping oxidation peaks appearing at ~2.39V and 2.44 V. A slight decrease in the overpotential during subsequent anodic scans is due to redistribution/activation of the elemental sulfur after the first oxidation, which lowers the polarization of TiO/S cathode. Moreover, after 2-3 cycles, the TiO/S cathode showed good electrochemical reversibility with repeated oxidation/reduction currents. The excellent electrochemical reversibility of the TiO/S cathode can be attributed to robust nanofibrous structures which provide inherent conducting channels for electron transfer during the oxidation/reduction process. At the same time, inter-fiber macropores of the TiO/S cathode assure easy penetration of the electrolyte thereby facilitating sulfur utilization.

Figure 6A:
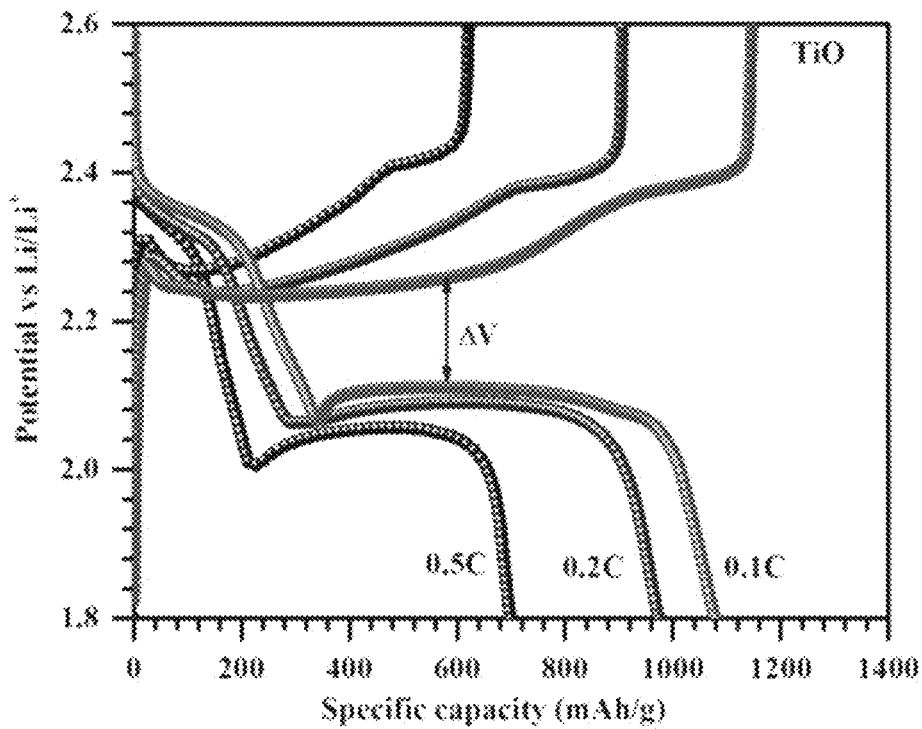
FIG. 6A shows a first galvanostatic charge-discharge curve for TiO/S cathodes at different C-rates.

The electrochemical performance of TiO/S cathodes was further investigated using galvanostatic charge-discharge analysis. The observed galvanostatic charge-discharge curves for TiO/S cathodes at different C-rates (where 1C=1675 mAh $g^{-1}$) are shown in FIG. 6A. The TiO/S cathode delivered high initial discharge capacities of ~1080 mAh $g^{-1}$, ~975 mAh $g^{-1}$, and ~791 mAh $g^{-1}$ at C-rates of 0.1C, 0.2C, and 0.5C, respectively after conditioning the cells. During the discharge processes, two voltage plateaus at ~2.35 V and ~2.05 V were observed, which were consistent with observed cathodic peaks in CVs of fabricated Li—S batteries. As the charging current increases, the overpotential of the Li—S coin cell (polarization of the cathode) increases thus leading to a more extensive voltage hysteresis between the discharge and charge curves (ΔV) at a higher 0.2C rate. At an even higher 0.5C rate, polarization also occurred at the anode, and the electrolyte, therefore, gave a large ΔV value.

Figure 6B:
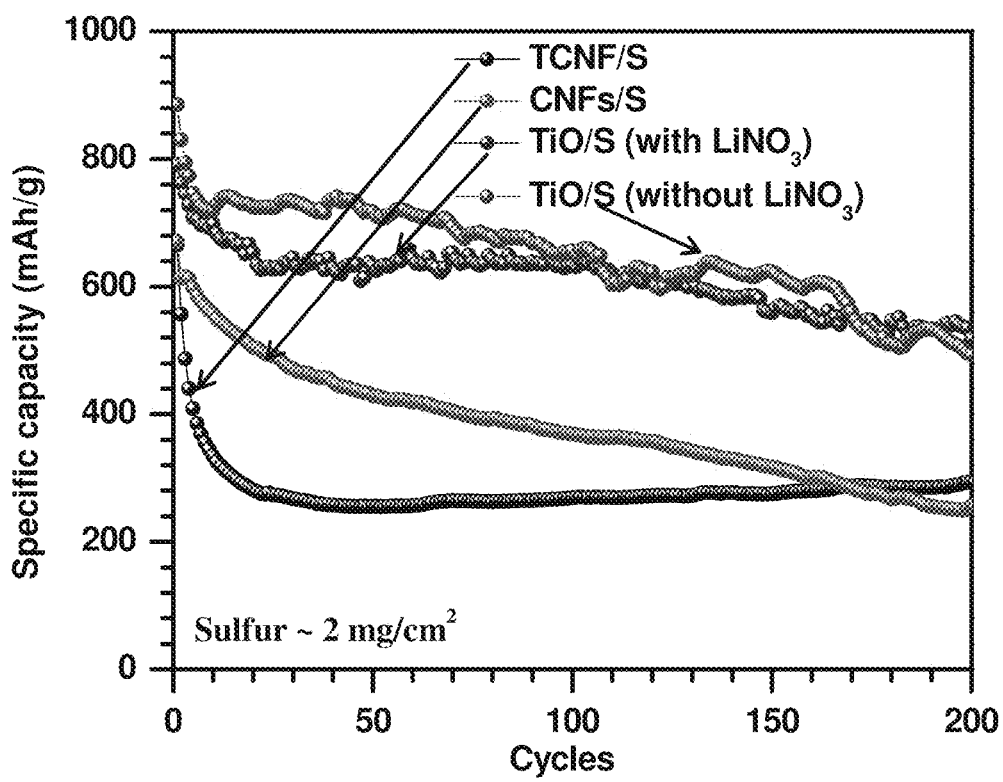
FIG. 6B shows a cyclic stability test at 0.5C rate for CNFs/S, TCNF/S, and TiO/S cathodes over 200 cycles.

To understand the advantage of the TiO/S cathode over TCNF/S and CNFs/S cathodes, assembled Li—S coin cells using all of these cathodes were cycled at a 0.5C rate as shown in FIG. 6B. Both the sulfur loading (~2 mg/cm$^2$) and the injected amount of the electrolyte (20 μL) were the same in each of these coin cells. The CNFs/S cathodes delivered an initial discharge specific capacity of ~670 mAh g$^{-1}$. This high specific capacity of the CNFs/S cathodes can be attributed to an appreciable electrical conductivity of the CNFs, which enabled better sulfur utilization. However, the specific capacity of the CNFs/S cathodes decreased continuously after a few cycles. On the other hand, the TCNF/S cathode showed an initial discharge specific capacity of ~664 mAh g$^{-1}$, which stabilized to ~275 mAh g$^{-1}$ after the first 15-20 cycles. The insulating/semiconducting nature of the TiO$_2$ material undermines the utilization of sulfur during reduction and Li$_2$S$_2$/Li$_2$S during oxidation. Consequently, TCNF/S cathodes showed a low discharge capacity in comparison to CNFs/S cathodes. The Li—S cell based on TiO/S cathodes exhibited the highest initial discharge capacity of ~791 mAh g$^{-1}$, which tends to stabilize at ~635 mAh g$^{-1}$ after an initial capacity drop due to redistribution/activation of the elemental sulfur. The TiO/S cathodes showed a long-term cyclic stability over 200 cycles with an average specific capacity of ~518 mAh g$^{-1}$. This relatively high specific capacity of the TiO/S cathode can be attributed to the higher electrical conductivity. The difference in cycling stability of these cathodes can be attributed to the interactions of the host materials with soluble polysulfides. As mentioned earlier, CNFs rely on weak physical adsorption of the soluble lithium polysulfides and thus are not effective to minimize the shuttling effect at high sulfur loading (~2 mg/cm$^2$). Therefore, the cyclic stability of CNFs/S cathodes is limited with a continuous capacity loss in each cycle. On the other hand, TiO$_2$ is more suitable for polysulfide trapping via polar-polar interactions ((polysulfide) Li$^+$-O$^{2-1}$ (TiO$_2$)). However, its low electrical conductivity deteriorates its specific capacity at higher S-loadings. The electrically conducting TiO is not only expected to adsorb soluble polysulfides via polar-polar interactions but can also potentially chemically bind lithium polysulfides through Lewis acid-base interactions. The presence of more available sites (due to nano-roughness on the surface as seen in the SEM) on the surface of TiO nanofibers with strong Lewis acid-base interactions is responsible for relatively better performance of the TiO/S cathodes.

Figure 6C:
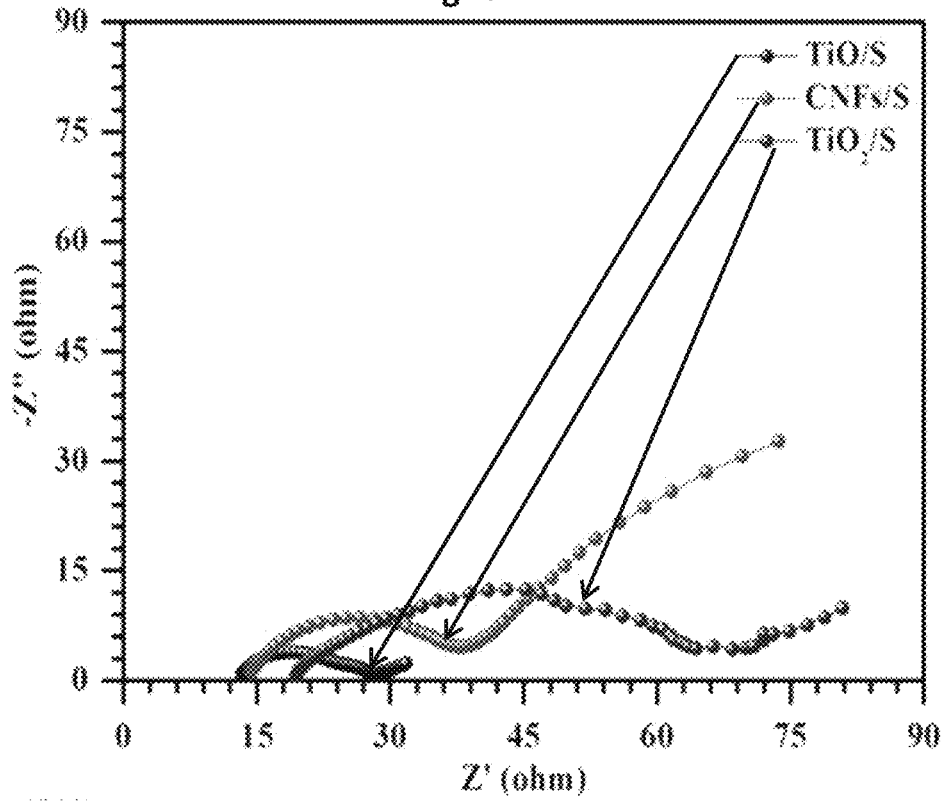
FIG. 6C shows Nyquist plots for CNFs/S, TCNF/S, and TiO/S based Li—S cells after the first cycle.

To further explain the enhanced electrochemical performance of the TiO/S cathode, electrochemical impedance analysis of assembled coin cells was performed using all three TiO/S, TCNF/S and CNFs/S cathodes just after the 1st reduction-oxidation cycle (at ~2.4 V, where second discharge begins). Typical Nyquist plots observed for all three cathodes showed a high-frequency semicircle due to the charge transfer resistance as shown in FIG. 6C. Compared to TCNF/S and CNFs/S cathodes, a semicircle with a smaller diameter for the TiO/S cathode suggests a lower charge-transfer resistance (R$_{ct}$). This small R$_{ct}$ is due to protruding nanoparticles of the micro/mesoporous TiO nanofibers which provide a large interfacial contact region for reduction/oxidation processes. Moreover, equivalent series resistance (ESR-intercept at x-axis) of the TiO/S cathodes is also smaller than that for the other two cathodes thus indicating an improved electrical conductivity of TiO/S cathode.

Figure 6D:
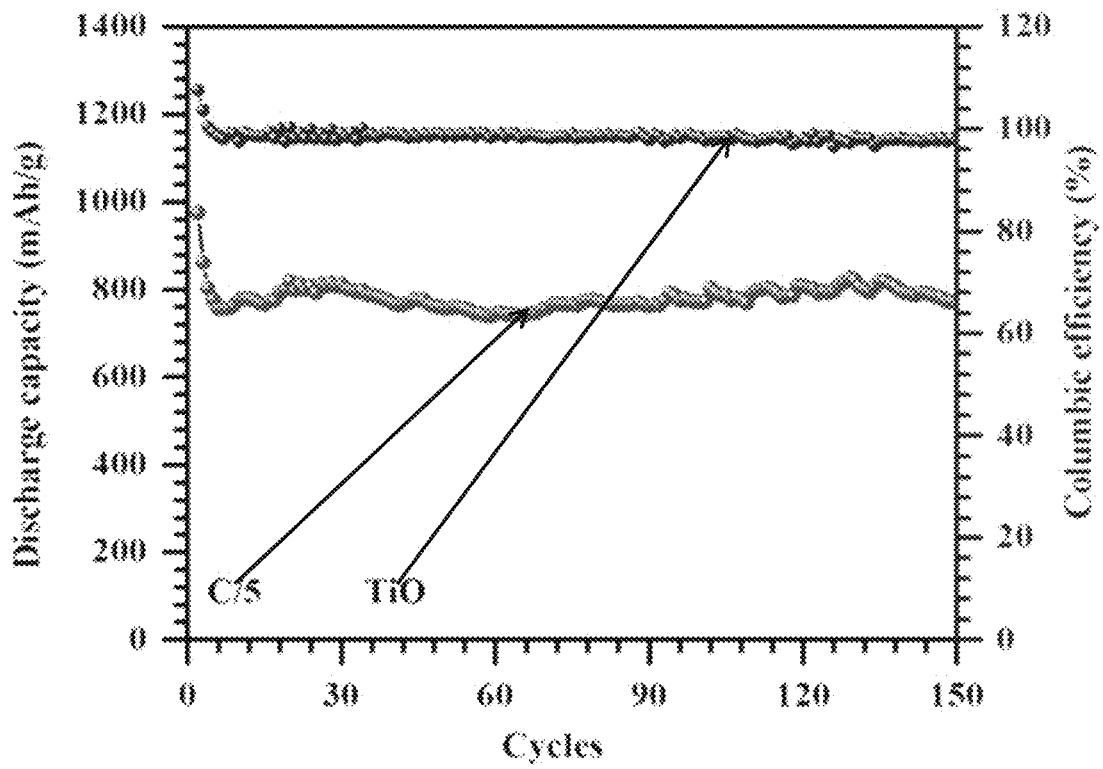
FIG. 6D shows the cyclic stability of TiO/S cathodes at 0.2C rates.
Figure 6E:
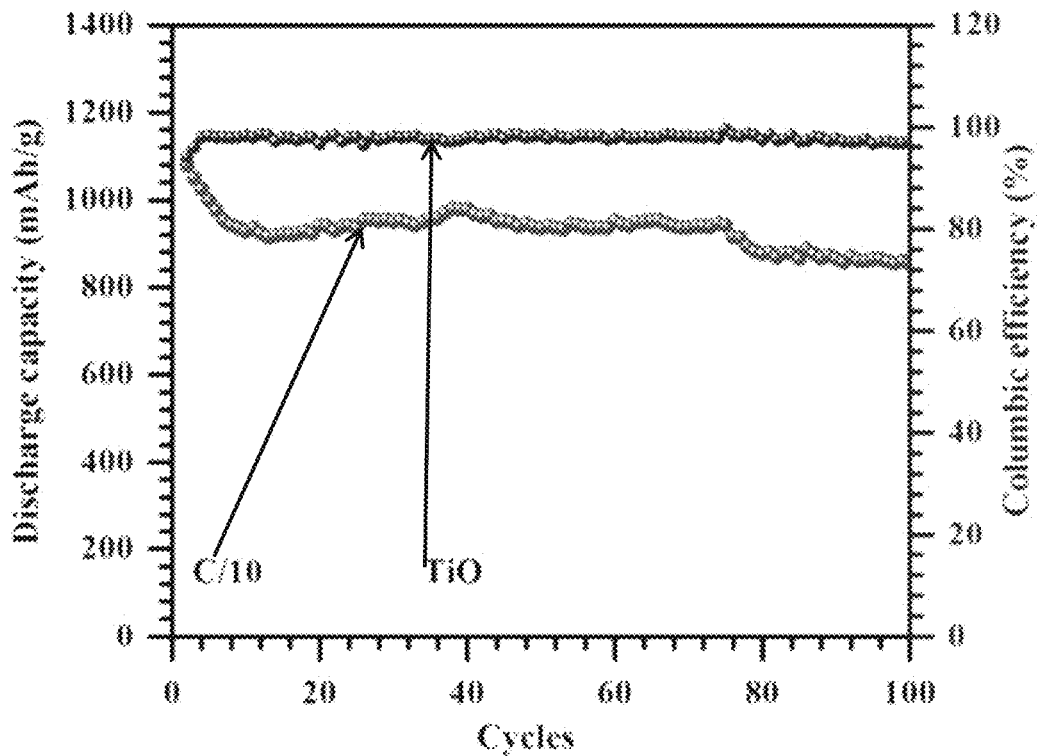
FIG. 6E shows the cyclic stability of TiO/S cathodes at 0.1C rates.
Figure 6F:
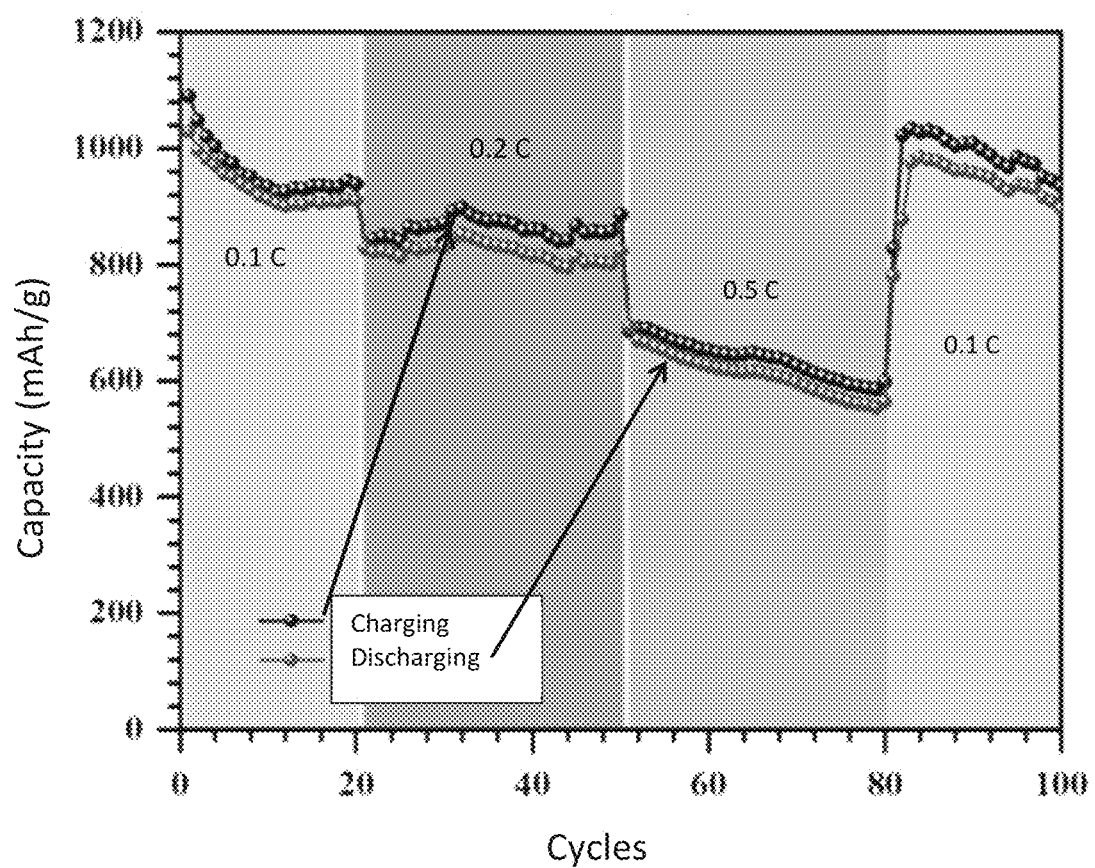
FIG. 6F shows a rate capability test at different C-rates for TiO/S based Li—S cells.

Furthermore, long-term cyclic stability of the TiO/S cathodes was also tested at 0.2 (150 cycles) and 0.1 (100 cycles) C-rates within the same voltage window (1.8-2.6V) as shown in FIGS. 6D-6E. At the 0.2 C-rate, TiO/S delivered a high specific capacity of ~1039 mAh g$^{-1}$, which tends to stabilize at ~790 mAh g$^{-1}$ after an initial drop during the first 3-4 cycles. As mentioned above, the initial decrease in the specific capacity is possibly due to the formation of large crystallites of sulfur within inter-fiber macropores during rapid infiltration. After redistribution/activation of sulfur during the initial 3-4 cycles, TiO/S cathodes retained a high specific capacity of ∧787 mAh g$^{-1}$ over 150 cycles with ~0.02% capacity attenuation per cycle. Similarly, at a 0.1 C-rate, TiO/S cathodes delivered a high specific capacity of ~1080 mAh g$^{-1}$, which stabilized to ~925 mAh g$^{-1}$ after an initial capacity loss during first few cycles. After 100 cycles, the specific capacity of the TiO/S cathodes was still 855 mAh g$^{-1}$. Finally, robustness of the TiO/S cathodes was evaluated at different C-rates at from 0.1C to 0.5C and at 0.5C to 0.1 C, respectively as shown in FIG. 6F. It can be seen that when the C-rate returned to 0.1C after 80 cycles, the TiO/S cathode almost recovered its stable discharge capacity (~897 mAh g$^{-1}$).

Figure 7:
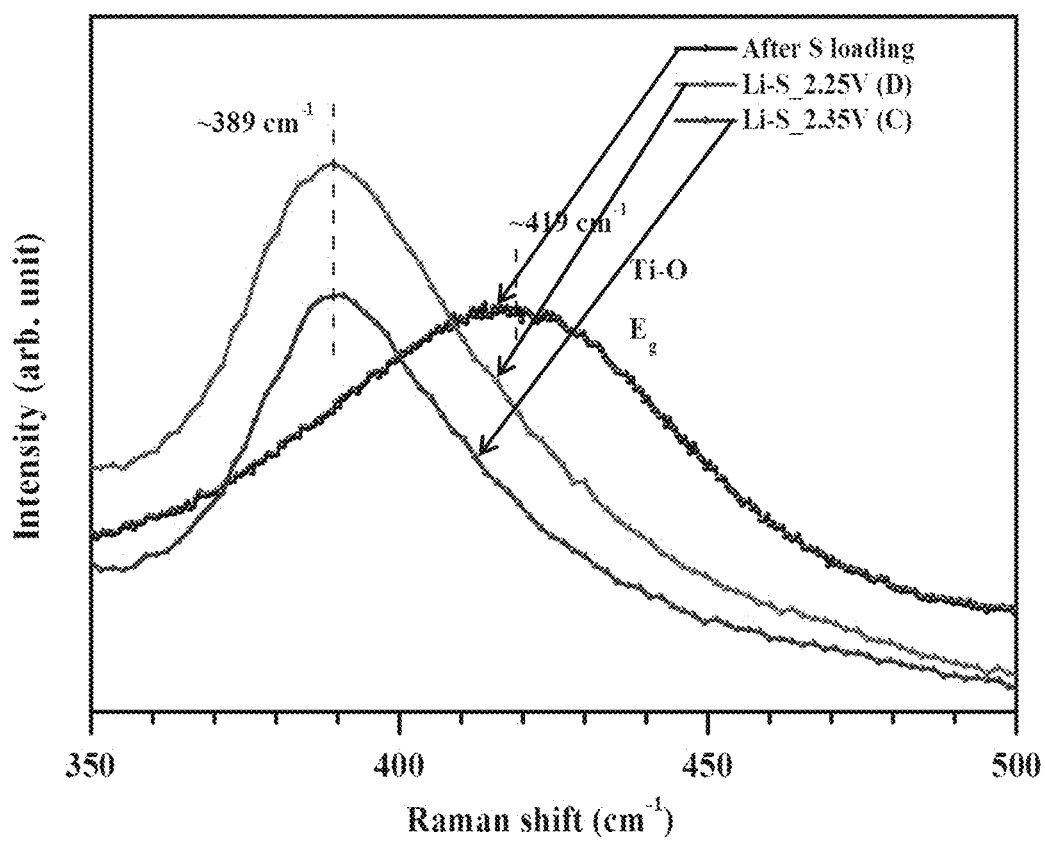
FIG. 7 shows a Raman spectra of as-prepared TiO/S and cycled TiO/S ($2.25V_{catholic}$ and $2.35V_{anodic}$) cathodes.

To understand the interactions between TiO and soluble lithium polysulfides (S$_x^{2-}$), postmortem Raman analysis was performed on cycled TiO/S cathodes. Li—S cells were stopped at a voltage of ~2.25V during a cathodic scan and at a voltage of ~2.35V during an anodic scan to prevent formation of thick coatings of Li$_2$S$_2$/Li$_2$S and elemental S$_8$, respectively. The cycled TiO/S cathodes were collected from Li—S cells disassembled inside an Ar-filled glove box and subjected to Raman measurement with a 532 nm Laser. FIG. 7 shows the observed Raman spectra of the as-prepared TiO/S cathodes and cycled TiO/S (2.25V$_{cathodic}$ and 2.35V$_{anodic}$) cathodes. The as-prepared TiO/S cathodes exhibited a broad E$_g$ mode Raman peak at ~419 cm$^{-1}$ due to the symmetric stretching vibration of O—Ti—O in fundamental TiO$_6$ octahedron building units. This peak is significantly red-shifted in comparison to rutile TiO$_2$ (E$_g$ ~447 cm$^{-1}$) due to the presence of a large fraction of structural vacancies in both the Ti— and O— sublattices of the TiO.

For the cycled TiO/S cathodes (both anodic and cathodic samples), the frequency of E$_g$ vibrations was significantly reduced with a wavenumber shift of ~30 cm$^{-1}$. This decrease in the vibration frequency can be attributed to interactions of lithium polysulfides (S$_x^{2-}$) through terminal sulfur (S$_T$) or Li$^+$ with Ti—O bonds. Lithium polysulfides (Li$_2$S$_x$) can simultaneously have polar-polar (Li$^+$—O—Ti) or Lewis acid-base (S$_T$—Ti—O) type interactions with Ti—O bonds. Both types of interactions can moderate the vibration frequency of Ti—O bonds and result in a red shift from ~419 to 389 cm$^{-1}$ in the E$_g$ mode. This shows that there is a possibility for the presence of strong Lewis acid-base interactions between TiO and lithium polysulfides. However, XPS measurements are required to confirm the formation of the Ti-S bond by Lewis acid-base interactions (S$_T$—Ti—O) and to substantiate the Raman results.

Figure 8A:
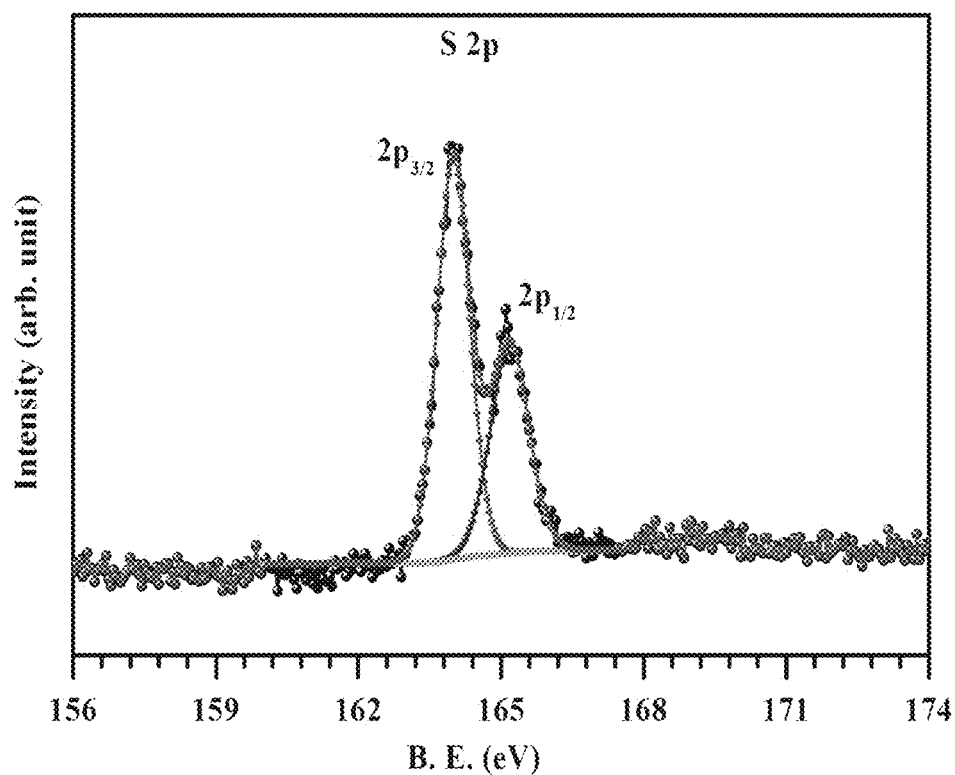
FIG. 8A shows a core level S2p spectra for the as-prepared TiO/S cathode.
Figure 8B:
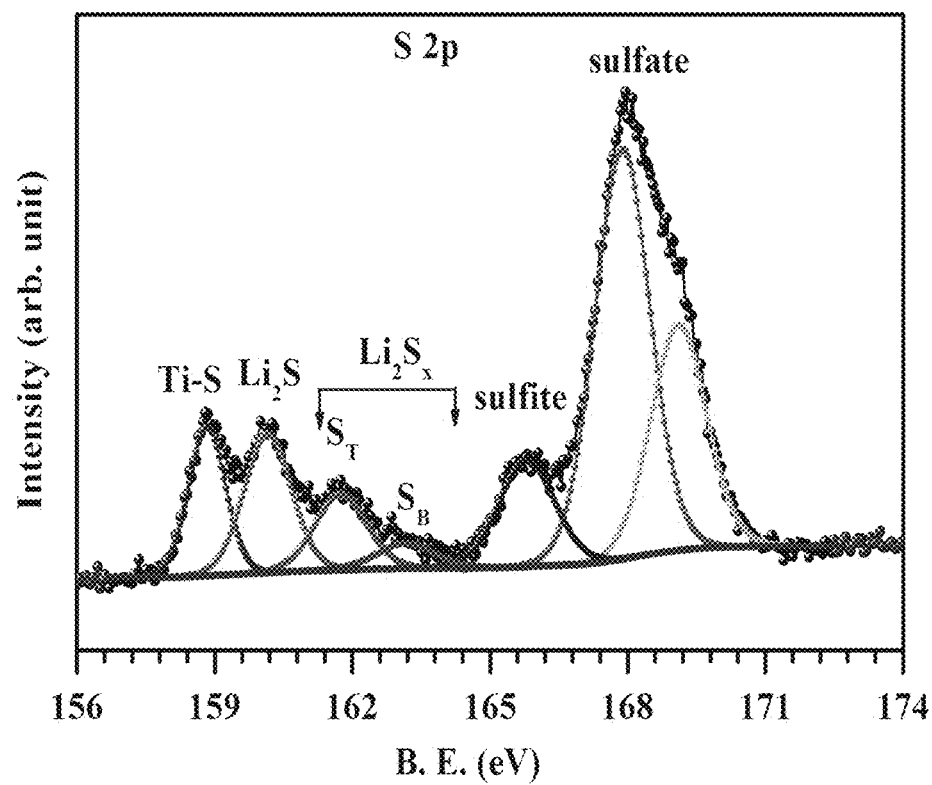
FIG. 8B shows a core level S2p spectra of the cycled TiO/S cathode.
Figure 8C:
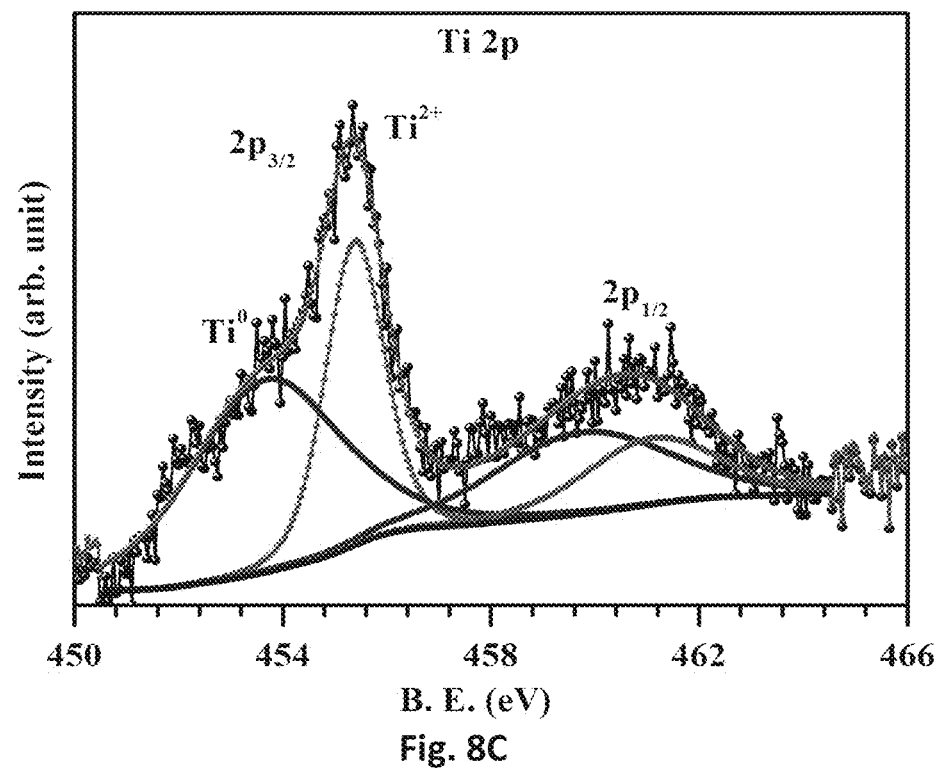
FIG. 8C shows a core level Ti 2p spectra for the as-prepared TiO/S cathode.
Figure 8D:
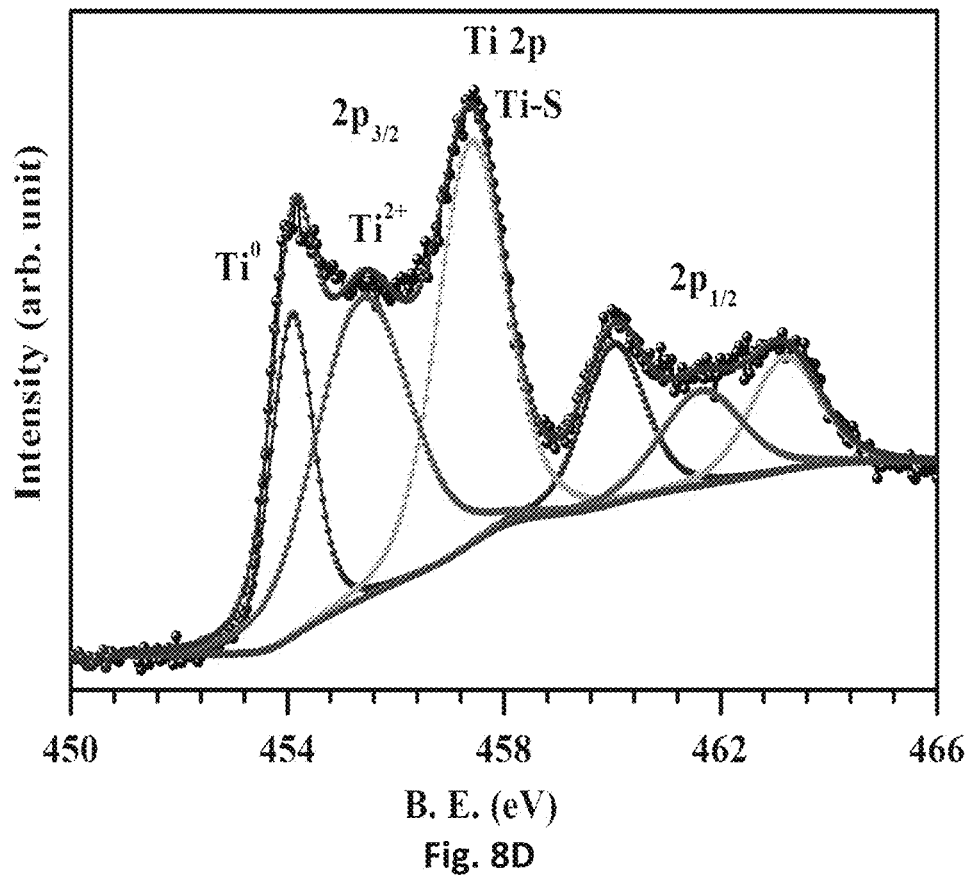
FIG. 8D shows a core level Ti 2p spectra of the cycled TiO/S cathode.
Figure 8E:
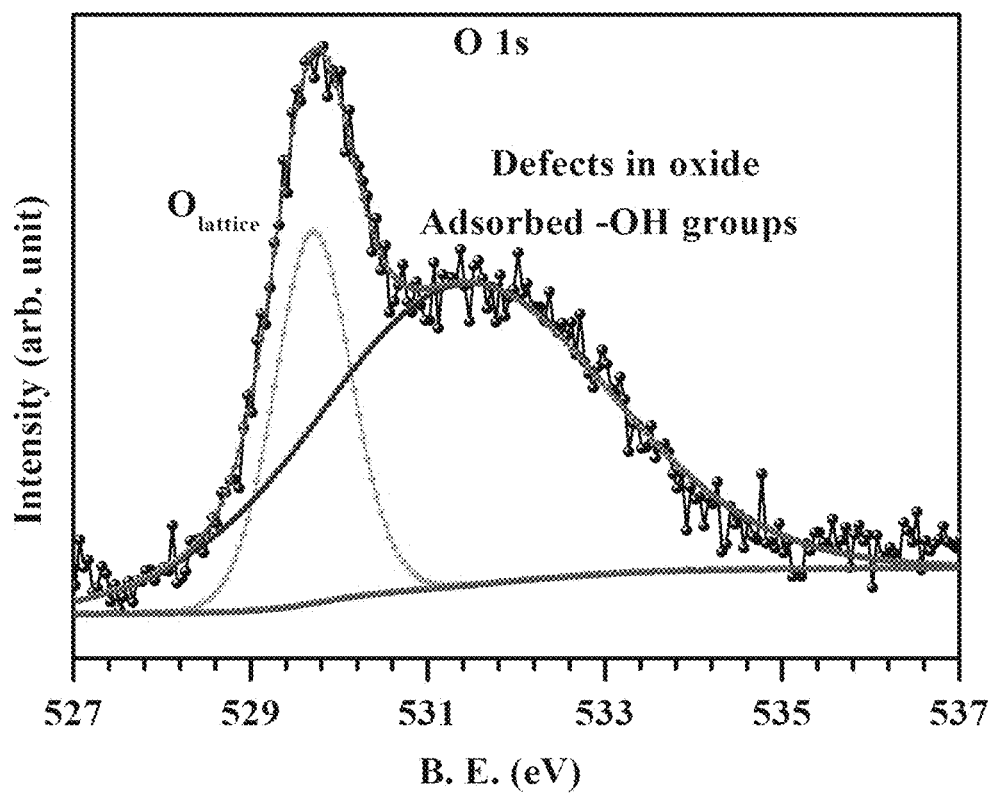
FIG. 8E shows a core level O is spectra of as-prepared TiO/S cathode.
Figure 8F:
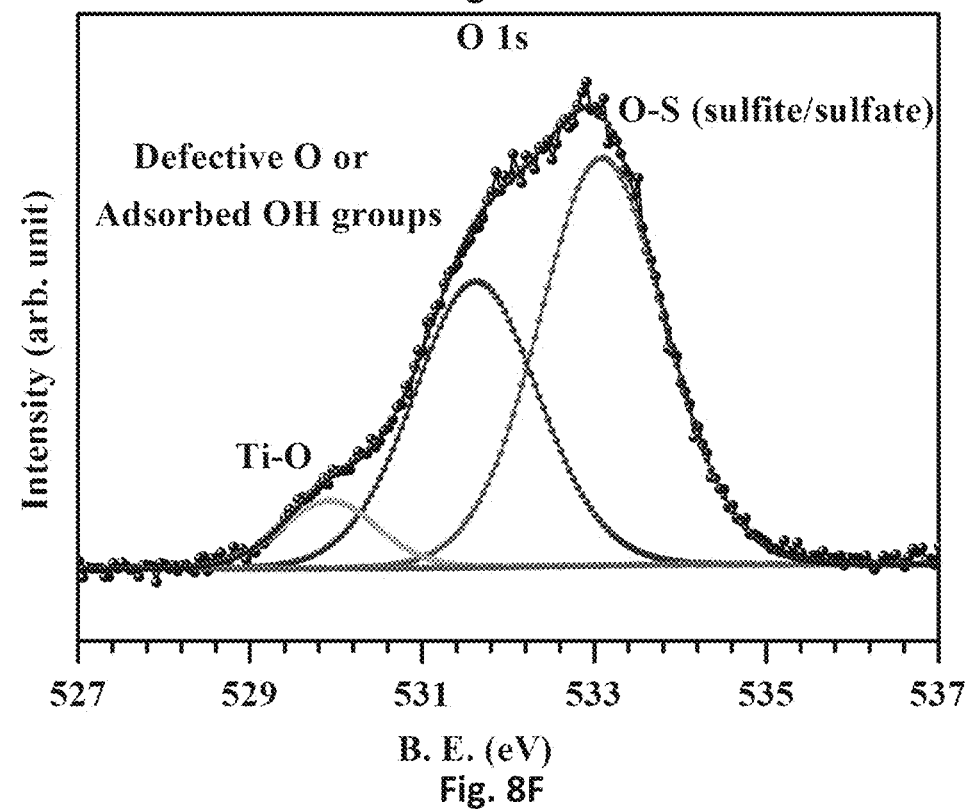
FIG. 8F shows a core level O is spectra of the cycled TiO/S cathode.
Figure 8G:
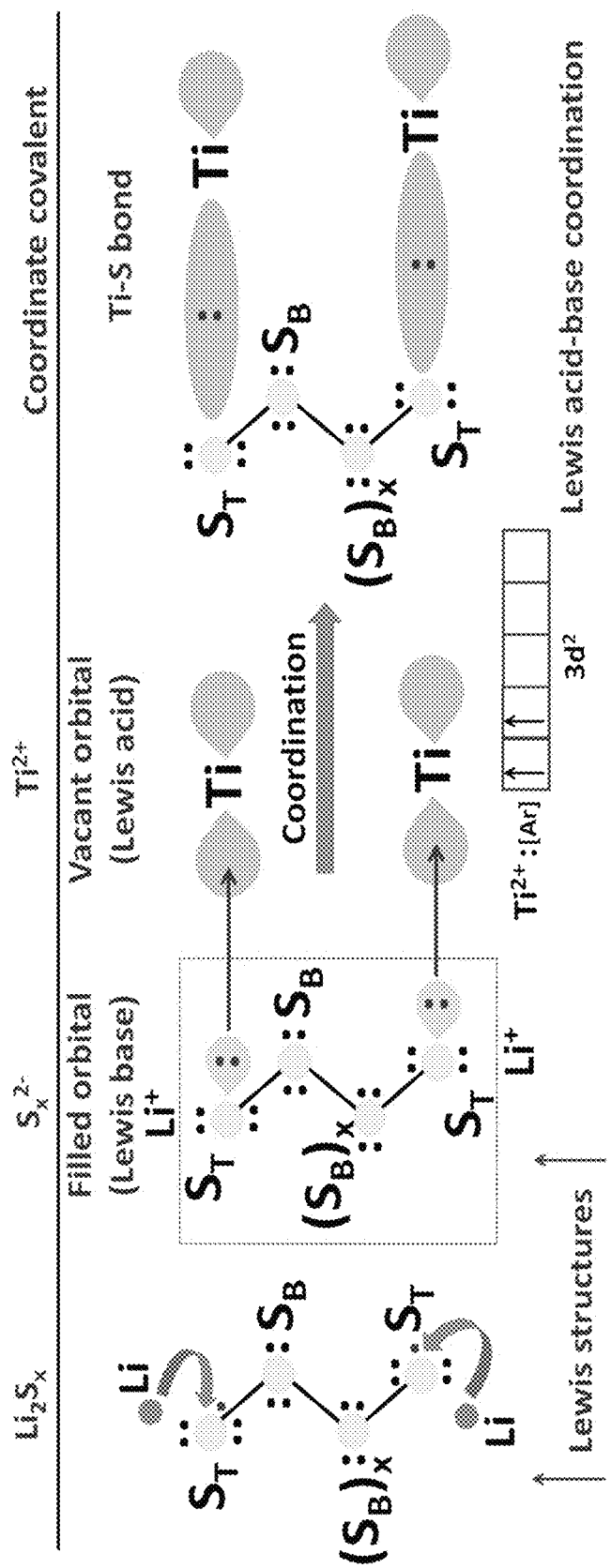
FIG. 8G shows a schematic of the Ti—S bond formation through coordination between unsaturated Ti-centers (Lewis acid) and terminal S ($S_T$) of $S_x^{2-}$ (polysulfides).

We analyzed core level S2p, Ti 2p and O 1s spectra of the as-prepared TiO/S cathode and TiO/S cathode from the Li—S cell (referred to as the cycled cathode) discharged to 2.1 V (just before the second plateau). We stopped the Li—S at ∧2.1 V during the second cathodic scan in the CV measurement to prevent the thick coating of Li$_2$S$_2$/Li$_2$S on the TiO nanofibers. Because lithium polysulfides species are highly sensitive to ambient air/moisture, both the cathode samples were introduced to the XPS from the Ar-filled glovebox using a specialized transfer vessel. This specially designed vessel allowed us to transfer samples to intro chamber of the XPS instrument without exposing them to the air environment. FIG. 8A shows the core level S2p spectra of the as-prepared TiO/S cathode. The S2p spectra of as-prepared TiO/S cathode exhibited a spin-orbit coupled doublet, i.e., two 2p$_{3/2}$ and 2p$_{1/2}$ components centered at binding energies ~164.04 eV and ~165.22 eV with an energy separation of 1.18 eV. The S2p spectrum of cycled cathodes is very different from S2p spectra of as-prepared TiO/S cathode and exhibited various sulfur-related environments as shown in FIG. 8B. Strong peaks appearing at binding energies ~165.8, ~167.88 eV and ~169.11 eV are assigned to sulfite and sulfate species, probably from the residual electrolyte. Two peaks centered at ~161.75 eV and ~163.16 eV could be attributed to terminal sulfur ($S_T$) and bridging sulfur ($S_B$) of the $S_x^{2-}$ (polysulfides). The peak originating at a binding energy of ~160.15 eV is due to the formation of the final $Li_2S$ product. All these mentioned binding energy values for sulfur species are well matched with those provided in previous reports. The existence of an additional peak at a relatively lower binding energy of ~158.88 eV can be distinctly attributed to the presence of Ti—S bond between low coordinated Ti-centers of TiO and lithium polysulfides ($S_x^{2-}$). The Ti—S bond formed between unsaturated Ti-metal ion centers in TiO and terminal sulfur ($S_T$) of the $S_x^{2-}$ (polysulfides) is due to Lewis acid-base interactions as explained in FIG. 8G. As mentioned earlier, titanium monoxide has a basic B1 cubic crystal structure with disordered structural vacancies in both Ti— and O— sublattices. Therefore, TiO is a strongly nonstoichiometric compound with a large number of unsaturated Ti-centers. Therefore TiO with unsaturated Ti-centers and vacant d-orbital ($Ti^{2+}$: [Ar] $3d^2$) acts as a Lewis acid. On the other hand, lithium polysulfides ($Li_2S_x$) exhibit two types of sulfur atoms viz., bridging ($S_B$) and terminal sulfur ($S_T$). When lithium polysulfides dissolve in the electrolyte, they produce $Li^+$ ions and $S_x^{2-}$ chains. Both terminal ($S_T$) sulfur atoms of the polysulfide chains ($S_x^{2-}$) have lone-pair electrons thus serving as Lewis base. The coordination between these terminal sulfur ($S_T$) and unsaturated Ti-centers leads to the formation of coordinate covalent type Ti—S bond during the Li—S cell operation. FIG. 8C shows Ti 2p spectra of as-prepared TiO/S cathodes which displayed two peaks at ~453.7 eV and ~455.4 eV. The former is attributed the metallic Ti—Ti type bonds which are due to O-vacancies in the sublattices. The latter is attributed to $Ti^{2+}$ state of the titanium in TiO/S sample. In the cycled TiO/S cathode, a new peak appeared at ~457.41 eV suggesting the formation of Ti—S bond as shown in FIG. 8D. These types of Lewis acid-base interactions are extreme in nature (bond energies ~3.5-7.0 eV) thus allowing TiO/S cathodes to show high specific capacity and long-term cyclic stability even at 2 mg/cm² sulfur loading. Moreover, polar-polar interactions between saturated Ti-centers and $Li^+$ of lithium polysulfides can also occur concurrently. Therefore we also analyzed O 1s spectra of the as-prepared and cycled TiO/S cathodes as shown in FIG. 8E-8F. The collected O 1s spectra of as-prepared TiO/S cathode displayed a broad peak which is the convolution of two component peaks as shown in FIG. 8E. The sharp peak centered at ~529.7 eV represents the lattice oxygen of Ti—O bond in the TiO/S sample. A broad peak centered at ~531.5 is due to defective oxygen (vacancies/defects) or adsorbed —OH groups. A positive shift in the binding energy of the lattice oxygen (~529.9 eV) indicates the presence of polar-polar interactions of TiO with the $Li^+$ of the polysulfides (Ti—O—Li+ type). We believe that these relatively weak polar-polar interactions are also contributing, to some extent, in enhancing the electrochemical performance of TiO/S cathodes.

Moreover, polar-polar interactions between saturated Ti-centers and $Li^+$ of lithium polysulfides can also occur at the same time. Therefore, the O 1s spectra of the cycled TiO/S cathodes were analyzed as shown in FIG. 9D. A positive shift in the binding energy of the Ti—O bond (~528.46 eV) indicates the presence of a polar-polar interaction of TiO with the $Li^+$ (Ti—O—$Li^+$) of the polysulfides. It is likely that these weak polar-polar interactions also contribute, to some extent, to enhancing the electrochemical performance of the TiO/S cathodes.

Therefore, the high specific capacity, good cyclic stability and rate performance of the TiO cathodes can be attributed to: (a) good electrical conductivity of TiO nanofibers, (b) inherent conducting pathways provided by the robust binder-free nanofibrous structures of TiO for uninterrupted electron supply, (c) facile transport of the electrolyte due to inter-fiber macropores, (d) the presence of strong Lewis acid-base interactions between TiO and soluble lithium polysulfides and weak polar-polar interactions. Moreover, TiO/S cathodes bestow the advantage of being free-standing thus eliminating the need for binders, current collectors and conducting additives. The additional dead weight of such materials ultimately has a detrimental effect on the total device capacity. At the same time, inter-fiber macropores of TiO nanofibers allow sulfur to diffuse rapidly along the thickness of the cathodes within just 5 seconds. Thus, free-standing TiO mats allow elimination of the use of harsh slurry casting processes for sulfur infiltration and cell assembly.

In conclusion, it was found that free-standing binder-free TiO nanofiber mats made by combining electrospinning and carbothermal processes provided cubic TiO nanofibers that exhibited a high BET surface area (~427 m²/g), good electrical conductivity and a coarser surface with micro/mesoporosity. The developed TiO nanofibers not only can moderate the diffusion of lithium polysulfides via unsaturated Ti-centres but also enhance the redox kinetics of sulfur. The TiO/S cathodes were developed using a rapid melt sulfur infiltration technique to obviate the need for inactive elements. Besides leading to a high capacity, and excellent cycling stability, these free-standing TiO nanofiber mats have also shown robustness due to their mechanically stable continuous 3D conducting network. XPS analysis, confirmed the presence of strong Lewis acid-base interactions in TiO, which moderate the shuttling effect in Li—S batteries. This eliminates the restriction on the use of highly dense powdered Ti-based suboxides/monoxide or similar polar host materials at higher S-loading in Li—S batteries. The electrospinning approach may enable development of various free-standing binder-free conducting polar host materials for future high-energy lithiumsulfur batteries.

Diffusion of Sulfur into Metal Oxide Mats

Commercial sulfur (Sigma, 100 mesh) was used as purchased without additional treatment. Metal oxide mats were punched into discs of about 11 mm in diameter. Sulfur powder was gently spread across the top of the mat surface until sufficient mass was present to obtain a sulfur content of about 47-52 wt. % or about 1.8-2.0 mg cm⁻² in the composite electrode. The sulfur and metal oxide mats were then placed between sheets of weighing paper and compressed in a heat press (Carver), and pre-heated to 140° C., under a mild pressure of about 200 psi for precisely 5 seconds.

Performance of Metal Oxide Nanofiber (without sulfur) Based Anodes in Lithium and Sodium Ion Batteries 1. NbO Nanofibers The same process used for TiO was also used to produce NbO. The nanofiber mat of NbO was used as an anode in a Na-ion battery and a Li-ion battery.

2. TiO Nanofibers in Li-Ion Battery

The TiO nanofiber mats (without sulfur) were also used as anodes in Li-ion batteries.

3. Titanium Suboxide Nanofibers

Figure 15A:
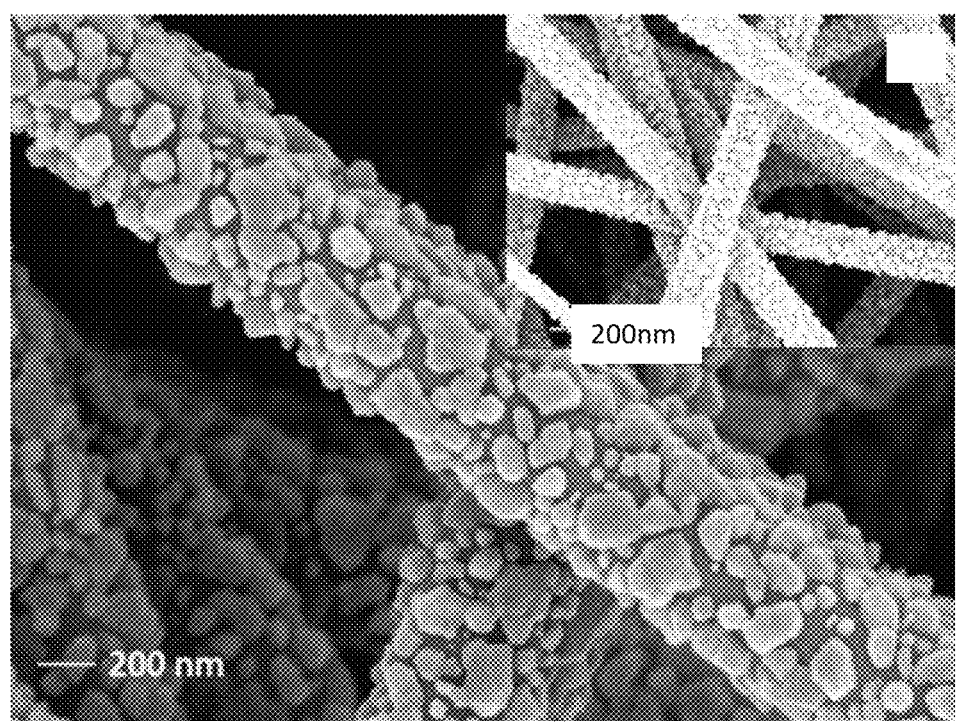
FIG. 15A shows SEM images of titanium suboxide nanofibers.
Figure 15B:
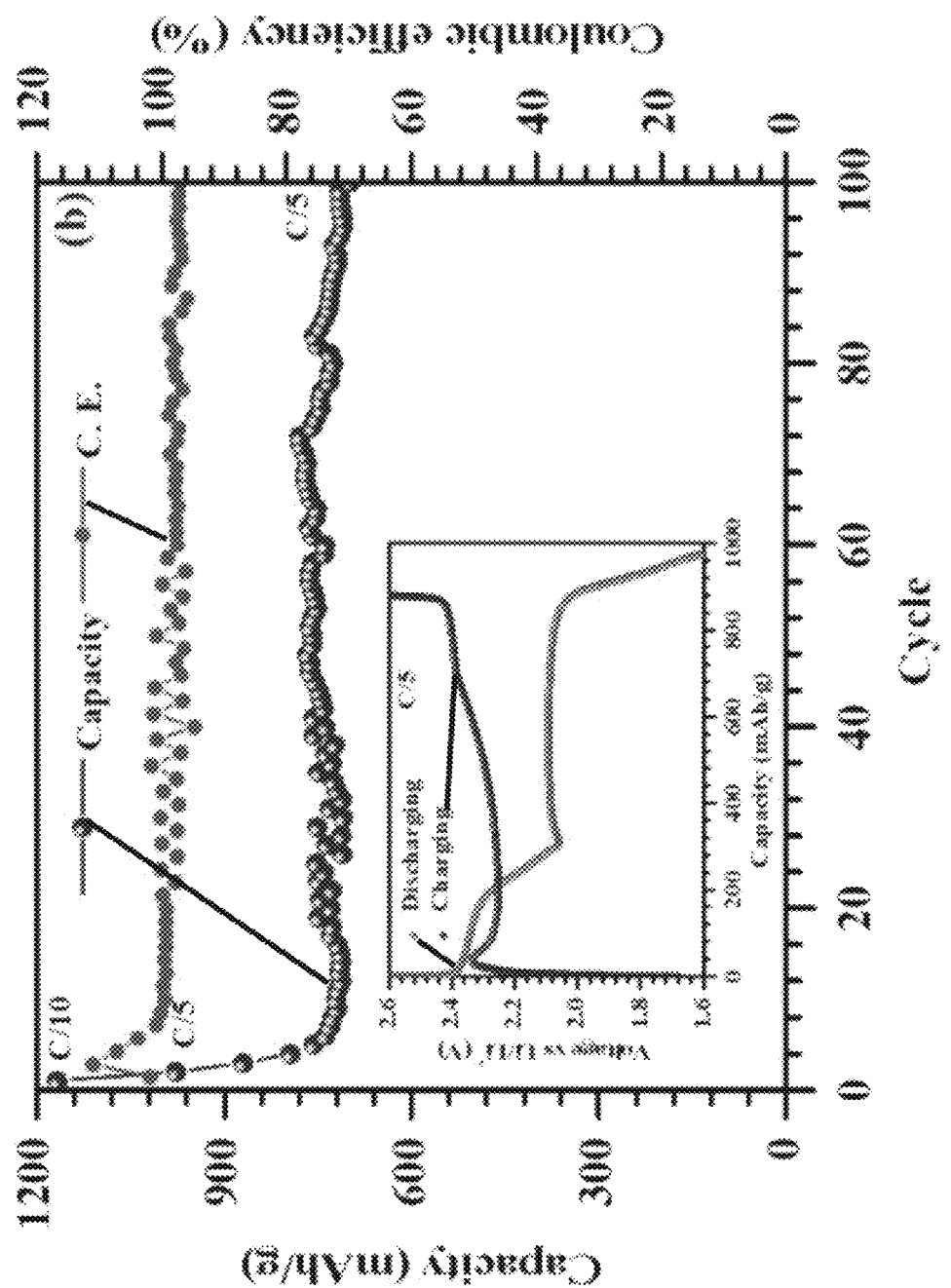
FIG. 15B shows the capacity and coulombic efficiencies over 100 cycles for titanium suboxide nanofiber mat cathodes in a Li—S battery.

A similar process was used to produce a nanofiber mat using titanium suboxide ($Ti_nO_{2n1}$, where n>1). The titanium suboxide nanofibers were produced by electrospinning titanium isopropoxide solution in the presence of polyvinylpyrrolidone followed by heating at 850° C. to create oxygen vacancies through a carbothermal reaction (FIG. 15A). Sulfur impregnation was carried out using the rapid melt-diffusion technique to form the sulfur/titanium suboxide cathodes. Lithium-sulfur coin cell batteries were assembled using as-prepared free-standing cathodes (without any current collector and binder) with ~50 wt % sulfur loading (~1.5 mg cm-2) and cycled at C/5 rate (1C=1675 mAh g-1) after conditioning at C/10 rate. The initial discharge capacity was ~976 mAh g-1 at C/5 rate, which stabilized to an average capacity of ~738 mAh g-1 after three cycles with a coulombic efficiency of >97%. The conducting titanium suboxide nanofibers allowed the effective utilization of sulfur/$Li_2S$ during discharging/charging of cells and helped to maintain a high discharge capacity (~700 mAh g-1) over 100 cycles. The chemical interaction between these inorganic hosts and lithium polysulfide will be discussed in detail (FIG. 15B). The electrochemical results presented here show the potential of the titanium suboxide family (different n values) as a solution to the shuttling effect for developing high performance Li—S batteries.

REFERENCES

The following references may be useful in understanding some of the principles discussed herein:
1. L. F. Nazar, M. Cuisinier and Q. Pang, *MRS Bulletin*, 2014, 39, 436-442.
2. S.-E. Cheon, K.-S. Ko, J.-H. Cho, S.-W. Kim, E.-Y. Chin and H.-T. Kim, *Journal of The Electrochemical Society*, 2003, 150, A796-A799.
3. 20020045102, 2002.
4. D.-W. Wang, Q. Zeng, G. Zhou, L. Yin, F. Li, H.-M. Cheng, I. R. Gentle and G. Q. M. Lu, *Journal of Materials Chemistry A*, 2013, 1, 9382-9394.
5. N. Jayaprakash, J. Shen, S. S. Moganty, A. Corona and L. A. Archer, *Angewandte Chemie*, 2011, 123, 6026-6030.
6. S. Evers and L. F. Nazar, *Accounts of Chemical Research*, 2013, 46, 1135-1143.
7. M.-S. Song, S.-C. Han, H.-S. Kim, J.-H. Kim, K.-T. Kim, Y.-M. Kang, H.-J. Ahn, S. X. Dou and J.-Y. Lee, *Journal of The Electrochemical Society*, 2004, 151, A791-A795.
8. X. Liang, C. Hart, Q. Pang, A. Garsuch, T. Weiss and L. F. Nazar, *Nat Commun*, 2015, 6.
9. K. Mi, Y. Jiang, J. Feng, Y. Qian and S. Xiong, *Advanced Functional Materials*, 2016, 26, 1571-1579.
10. H.-J. Peng, J.-Q. Huang, M.-Q. Zhao, Q. Zhang, X.-B. Cheng, X.-Y. Liu, W.-Z. Qian and F. Wei, *Advanced Functional Materials*, 2014, 24, 2772-2781.
11. X. a. Chen, Z. Xiao, X. Ning, Z. Liu, Z. Yang, C. Zou, S. Wang, X. Chen, Y. Chen and S. Huang, *Advanced Energy Materials*, 2014, 4, 1301988-n/a.
12. Z. Li, J. T. Zhang, Y. M. Chen, J. Li and X. W. Lou, *Nat Commun*, 2015, 6.
13. J.-G. Wang, K. Xie and B. Wei, *Nano Energy*, 2015, 15, 413-444.
14. Y. Zhao, Y. Zhang, Z. Bakenova and Z. Bakenov, Frontiers in Energy Research, 2015, 3.
15. G. Zhou, S. Pei, L. Li, D.-W. Wang, S. Wang, K. Huang, L.-C. Yin, F. Li and H.-M. Cheng, *Advanced Materials*, 2014, 26, 625-631.
16. N. Li, Z. Chen, W. Ren, F. Li and H.-M. Cheng, *Proceedings of the National Academy of Sciences of the United States of America*, 2012, 109, 17360-17365.
17. Y. Zhao, F. Yin, Y. Zhang, C. Zhang, A. Mentbayeva, N. Umirov, H. Xie and Z. Bakenov, *Nanoscale Research Letters*, 2015, 10, 450.
18. A. Schneider, C. Suchomski, H. Sommer, J. Janek and T. Brezesinski, *Journal of Materials Chemistry A*, 2015, 3, 20482-20486.
19. Y. Chen, S. Lu, X. Wu and J. Liu, *The Journal of Physical Chemistry C*, 2015, 119, 10288-10294.
20. Z. Yuan, H.-J. Peng, J.-Q. Huang, X.-Y. Liu, D.-W. Wang, X.-B. Cheng and Q. Zhang, *Advanced Functional Materials*, 2014, 24, 6105-6112.
21. C. Wu, L. Fu, J. Maier and Y. Yu, *Journal of Materials Chemistry A*, 2015, 3, 9438-9445.
22. L. Zhu, H.-J. Peng, J. Liang, J.-Q. Huang, C.-M. Chen, X. Guo, W. Zhu, P. Li and Q. Zhang, *Nano Energy*, 2015, 11, 746-755.
23. W. Ni, J. Cheng, X. Li, Q. Guan, G. Qu, Z. Wang and B. Wang, *RSC Advances*, 2016, 6, 9320-9327.
24. X. Huang, B. Sun, K. Li, S. Chen and G. Wang, *Journal of Materials Chemistry A*, 2013, 1, 13484-13489.
25. Z. Zhang, Q. Li, K. Zhang, W. Chen, Y. Lai and J. Li, *Journal of Power Sources*, 2015, 290, 159-167.
26. L. Zeng, F. Pan, W. Li, Y. Jiang, X. Zhong and Y. Yu, *Nanoscale*, 2014, 6, 9579-9587.
27. G.-L. Xu, Y.-F. Xu, J.-C. Fang, X.-X. Peng, F. Fu, L. Huang, J.-T. Li and S.-G. Sun, *ACS Applied Materials & Interfaces*, 2013, 5, 10782-10793.
28. G. He, X. Ji and L. Nazar, *Energy & Environmental Science*, 2011, 4, 2878-2883.
29. M. Yu, A. Wang, F. Tian, H. Song, Y. Wang, C. Li, J.-D. Hong and G. Shi, *Nanoscale*, 2015, 7, 5292-5298.
30. G. Li, H. Jing, H. Li, L. Liu, Y. Wang, C. Yuan, H. Jiang and L. Chen, *Ionics*, 2015, 21, 2161-2170.
31. K. Fu, Y. Li, M. Dirican, C. Chen, Y. Lu, J. Zhu, Y. Li, L. Cao, P. D. Bradford and X. Zhang, *Chemical Communications*, 2014, 50, 10277-10280.
32. M. Hagen, S. Dorfler, P. Fanz, T. Berger, R. Speck, J. Tübke, H. Althues, M. J. Hoffmann, C. Scherr and S. Kaskel, *Journal of Power Sources*, 2013, 224, 260-268.
33. M. S. A. Rahaman, A. F. Ismail and A. Mustafa, *Polymer Degradation and Stability*, 2007, 92, 1421-1432.
34. B. Zhang, F. Kang, J.-M. Tarascon and J.-K. Kim, *Progress in Materials Science*, 2016, 76, 319-380.
35. L. Laffont, M. Monthioux, V. Serin, R. B. Mathur, C. Guimon and M. F. Guimon, *Carbon*, 2004, 42, 2485-2494.
36. L. Zhang, A. Aboagye, A. Kelkar, C. Lai and H. Fong, *Journal of Materials Science*, 2014, 49, 463-480.
37. Z. Li, X. Li, Y. Liao, X. Li and W. Li, *Journal of Power Sources*, 2016, 334, 23-30.
38. G. Li, J. Sun, W. Hou, S. Jiang, Y. Huang and J. Geng, *Nature Communications*, 2016, 7, 10601.
39. N.-W. Li, Y.-X. Yin and Y.-G. Guo, *RSC Advances*, 2016, 6, 617-622.
40. Z. Wei Seh, W. Li, J. J. Cha, G. Zheng, Y. Yang, M. T. McDowell, P.-C. Hsu and Y. Cui, *Nature Communications*, 2013, 4, 1331.
41. C. Zhang, H. B. Wu, C. Yuan, Z. Guo and X. W. Lou, *Angewandte Chemie*, 2012, 124, 9730-9733.
42. H.-J. Peng, T.-Z. Hou, Q. Zhang, J.-Q. Huang, X.-B. Cheng, M.-Q. Guo, Z. Yuan, L.-Y. He and F. Wei, *Advanced Materials Interfaces*, 2014, 1, n/a-n/a.

43. Q. Pang, X. Liang, C. Y. Kwok and L. F. Nazar, *Journal of The Electrochemical Society*, 2015, 162, A2567-A2576.
44. L. Ma, H. L. Zhuang, S. Wei, K. E. Hendrickson, M. S. Kim, G. Cohn, R. G. Hennig and L. A. Archer, *ACS Nano*, 2016, 10, 1050-1059.
45. J. Song, T. Xu, M. L. Gordin, P. Zhu, D. Lv, Y.-B. Jiang, Y. Chen, Y. Duan and D. Wang, *Advanced Functional Materials*, 2014, 24, 1243-1250.
46. K. A. See, Y.-S. Jun, J. A. Gerbec, J. K. Sprafke, F. Wudl, G. D. Stucky and R. Seshadri, *ACS Applied Materials & Interfaces*, 2014, 6, 10908-10916.
47. G. Zhou, L.-C. Yin, D.-W. Wang, L. Li, S. Pei, I. R. Gentle, F. Li and H.-M. Cheng, *ACS Nano*, 2013, 7, 5367-5375.
48. D.-W. Wang, F. Li, L.-C. Yin, X. Lu, Z.-G. Chen, I. R. Gentle, G. Q. Lu and H.-M. Cheng, *Chemistry—A European Journal*, 2012, 18, 5345-5351.
49. M. Kazazi, F. Ghadami, M. R. Dadfar, M. Sobhani and A. H. Mohammadi, *Solid State Ionics*, 2016, 290, 40-46.
50. K. Xi, P. R. Kidambi, R. Chen, C. Gao, X. Peng, C. Ducati, S. Hofmann and R. V. Kumar, *Nanoscale*, 2014, 6, 5746-5753.
51. C. Wang, X. Wang, Y. Wang, J. Chen, H. Zhou and Y. Huang, *Nano Energy*, 2015, 11, 678-686.
52. L. Zeng, Y. Jiang, J. Xu, M. Wang, W. Li and Y. Yu, *Nanoscale*, 2015, 7, 10940-10949. 53. Journal, 2012, 87.

What is claimed is:

1. A method of producing a nanofiber mat suitable for use in an electrode of a battery from a solution of metal oxide precursor and carbon-containing polymer, comprising steps of:
    electrospinning the solution of metal oxide precursor into nanofibers to form a mat;
    heating the mat at a temperature in a range of from 750° C. to 1100° C. for a period of from about 4 hours to about 7 hours in an absence of oxygen under a nitrogen flow to produce the nanofiber mat, and
    wherein the metal oxide precursor is selected from the group consisting of titanium isopropoxide Ti{OCH(CH$_3$)$_2$}$_4$, niobium ethoxide Nb$_2$(OC$_2$H$_5$)$_{10}$, vanadyl acetylacetonate C$_{10}$H$_{14}$O$_5$V, iron acetylacetonate Fe(C$_5$H$_7$O$_2$)$_3$, manganese (II) acetate tetrahydrate, and Mn(CH$_3$COO)$_2$.(H$_2$O)$_n$, where n is a non-negative integer.

2. The method of claim 1, wherein the carbon-containing polymer is selected from the group consisting of polyvinylpyrrolidone, polyvinylpyrrolidone (PVP) (C$_6$H$_9$NO)$^{n-}$, polyacrylonitrile (PAN) (C$_3$H$_3$N)$_n$, poly(methyl methacrylate) (PMMA) (C$_5$O$_2$H$_8$)n, poly(vinyl alcohol) (PVA) (C$_4$H$_6$O$_2$)$_n$, and polyvinylidene fluoride (PVDF) —(C$_2$H$_2$F$_2$)$^{n-}$.

3. The method of claim 1, wherein the metal oxide solution further comprises a solvent selected from the group consisting of anhydrous ethanol, methanol CH$_3$OH, ethanol C$_2$H$_5$OH, N,N—dimethylformamide (DMF) C$_3$H$_7$NO, chloroform CHCl$_3$, deionized (DI) water H$_2$O, toluene C$_7$H$_8$, acetic acid CH$_3$COOH, and tetrahydrofuran (THF) C$_4$H$_8$O.

4. The method of claim 1, wherein the heating step is carried out at a temperature in the range of from about 850° C. to about 1050° C.

5. The method of claim 1, wherein the solvent comprises acetic acid.

6. The method of claim 5, wherein the solvent further comprises anhydrous ethanol.

7. A method for making an electrode material comprising the steps of claim 1, and further comprising steps of:
    melting sulfur on the nanofiber mat after the heating step under a pressure greater than one atmosphere to form molten sulfur, and
    diffusing the molten sulfur onto the surface area of the nanofiber mat.

8. The method of claim 7, wherein the sulfur comprises a conductive additive selected from the group consisting of conductive carbon powders, graphite powders, graphenes, mesoporous carbons, activated carbons, carbon nanotubes, mxenes, conductive polymers, conductive metal oxides/suboxides, metals and any other material that conducts electrons.

9. The method of claim 7, wherein the step of melting the sulfur is carried out at a temperature in a range of from about 119° C. to about 170° C. for a period of from about 3 minutes to about 500 minutes and at a pressure in a range of from about 15 psi to about 2000 psi.

10. The method of claim 1, wherein the heating step forms a metal oxide selected from the group consisting of titanium monoxide TiO$_x$, wherein 0.65<x<1.25, niobium monoxide NbO$_x$, wherein 0.982<x<1.008, vanadium (II) oxide VO$_x$, wherein 0.79<x<1.29, iron (II) oxide Fe$_x$O, wherein 0.833<x<0.957, manganese (II) oxide Mn$_x$O, wherein 0.848<x<1.000, titanium suboxide, Ti$_n$O$_{2n-1}$, wherein n>1, molybdenum suboxide, Mo$_n$O$_{3n-1}$, wherein n>1, Mo$_n$O$_{3n-1}$, wherein n>1, and vanadium suboxide, VnO$_{2n-1}$, wherein n>1.

11. The method of claim 8, wherein the sulfur is provided to the melting step in a powder form, or a particle form.

12. The method of claim 7, wherein a sufficient amount of sulfur is employed to ensure that the nanofiber mat has a sulfur content in a range of from about 10 wt. % to about 90 wt. %, based on a total weight of the nanofiber mat.

13. The method of claim 7, wherein a sufficient amount of sulfur is employed to ensure that the nanofiber mat has a sulfur content in a range of from about 30 wt. % to about 80 wt. %, based on a total weight of the nanofiber mat.

* * * * *